(12) United States Patent
Fujita et al.

(10) Patent No.: US 7,794,801 B2
(45) Date of Patent: *Sep. 14, 2010

(54) LIQUID CRYSTAL COMPOSITION AND LIQUID CRYSTAL DISPLAY DEVICE

(75) Inventors: Hiroaki Fujita, Ichihara (JP); Norikatsu Hattori, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/159,613

(22) PCT Filed: Jan. 11, 2007

(86) PCT No.: PCT/JP2007/050233

§ 371 (c)(1), (2), (4) Date: Jun. 27, 2008

(87) PCT Pub. No.: WO2007/083561

PCT Pub. Date: Jul. 26, 2007

(65) Prior Publication Data

US 2009/0103042 A1    Apr. 23, 2009

(30) Foreign Application Priority Data

Jan. 17, 2006    (JP)    ............... 2006-008520

(51) Int. Cl.
*C09K 19/30*    (2006.01)
*C09K 19/12*    (2006.01)
*G02F 1/13*    (2006.01)

(52) U.S. Cl. ............... 428/1.1; 252/299.63; 252/299.66

(58) Field of Classification Search ............... 428/1.1; 252/299.63, 299.66

See application file for complete search history.

(56) References Cited

U.S. PATENT DOCUMENTS

| 4,415,470 | A | 11/1983 | Eidenschink et al. |
| 4,637,897 | A | 1/1987 | Kelly |
| 6,329,027 | B1 | 12/2001 | Kondo et al. |
| 7,514,128 | B2 * | 4/2009 | Fujita et al. .................. 428/1.3 |
| 7,618,691 | B2 * | 11/2009 | Hattori et al. ................ 428/1.1 |
| 2006/0198968 | A1 | 9/2006 | Goto et al. |
| 2006/0210725 | A1 * | 9/2006 | Fujita et al. .................. 428/1.1 |
| 2009/0032771 | A1 * | 2/2009 | Saito ..................... 252/299.63 |

FOREIGN PATENT DOCUMENTS

| DE | 3906058 | 2/1989 |
| DE | 4223059 | 7/1992 |
| EP | 0364538 | 2/1989 |
| JP | 2005314598 | 11/2005 |

* cited by examiner

*Primary Examiner*—Shean C Wu
(74) *Attorney, Agent, or Firm*—J.C. Patents

(57) ABSTRACT

A liquid crystal composition is provided that has a wide temperature range of a nematic phase, a small viscosity, a suitable optical anisotropy, a large negative dielectric anisotropy and a large specific resistance, and a liquid crystal composition is provided that satisfies these characteristics and also has a low minimum temperature of a nematic phase, preferably −20° C. or less. A liquid crystal display device containing the liquid crystal composition is also provided. The liquid crystal composition has a negative dielectric anisotropy and contains a liquid crystal compound having an ethylene bond and 2,3-difluorophenylene as a first component and a liquid crystal compound having phenylene having halogens replacing two hydrogens as the second component, and the liquid crystal display device contains the liquid crystal composition.

25 Claims, No Drawings

LIQUID CRYSTAL COMPOSITION AND LIQUID CRYSTAL DISPLAY DEVICE

CROSS-REFERENCE TO RELATED APPLICATIONS

This application is a national phase application of international application No. PCT/JP2007/050233 filed on Jan. 11, 2007, which claims the priority benefit of Japan application No. 2006-008520 filed on Jan. 17, 2007. The contents of these prior applications are hereby incorporated by reference in its entirety.

BACKGROUND OF THE INVENTION

1. Field of the Invention

The invention relates to a liquid crystal composition and a liquid crystal display device. More specifically, the invention relates to a liquid crystal composition suitable for use in a liquid crystal display device driven in an AM (active matrix) mode, and a liquid crystal display device containing the composition.

2. Related Art

A liquid crystal display device (which is a generic term for a liquid crystal display panel and a liquid crystal display module) utilizes optical anisotropy, dielectric anisotropy and so forth of a liquid crystal composition, and as an operating mode of the liquid crystal display device, such various modes have been known as a PC (phase change) mode, a TN (twisted nematic) mode, an STN (super twisted nematic) mode, a BTN (bistable twisted nematic) mode, an ECB (electrically controlled birefringence) mode, an OCB (optically compensated bend) mode, an IPS (in-plane switching) mode, a VA (vertical alignment) mode, and so forth. Among the operation modes, an ECB mode, an IPS mode, a VA mode and so forth have been known as being capable of improving a narrow viewing angle, which is a defect of the conventional operation mode, such as a TN mode, an STN mode and so forth. The liquid crystal composition having a negative dielectric anisotropy can be used in the liquid crystal display device of these operation modes.

As a liquid crystal composition having a negative dielectric anisotropy capable of being used in a liquid crystal display device of these operation modes, various compositions have been investigated that contain a liquid crystal compound having 2,3-difluorophenylene in which hydrogen on a benzene ring is replaced by fluorine. For example, Japanese Patent Nos. 2,811,342 and 1,761,492 disclose liquid crystal compounds having 2,3-difluorophenylene.

The term "liquid crystal compound" referred herein is a generic term for a compound having a liquid crystal phase, such as a nematic phase, a smectic phase and so forth, and also for a compound having no liquid crystal phase but being useful as a component of a liquid crystal composition. The content ratio of the component is calculated based on the total weight of the liquid crystal compounds. The liquid crystal compound herein is a compound represented by formula (A). The compound may be an optically active compound:

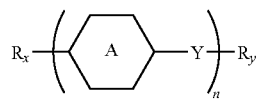

(A)

In formula (A), $R_x$ and $R_y$ are independently are hydrogen, alkyl, alkoxy, alkoxyalkyl, alkoxyalkoxy, acyloxy, acyloxyalkyl, alkoxycarbonyl, alkoxycarbonylalkyl, alkenyl, alkenyloxy, alkenyloxyalkyl, alkoxyalkenyl, alkynyl, alkynyloxy, cyano, —NCS, fluorine or chlorine. These groups have 10 or less carbons. In the group having 1 to 5 carbons, arbitrary hydrogen may be replaced by fluorine or chlorine, and the total number of the replaced fluorine and chlorine is 1 to 11. In formula (A), ring A is 1,4-cyclohexylene, 1,4-phenylene, pyrane-2,5-diyl, 1,3-dioxane-2,5-diyl, pyridine-2,5-diyl, pyrimidine-2,5-diyl, decahydronaphthalene-2,6-diyl, 1,2,3,4-tetrahydronaphthalene-2,6-diyl or naphthalene-2,6-diyl. In ring A, arbitrary hydrogen may be replaced by fluorine or chlorine. In ring A, the total number of the replaced fluorine and chlorine is 1 to 4. In the 1,4-phenylene, arbitrary one or two hydrogens may be replaced by cyano, methyl, difluoromethyl or trifluoromethyl.

In formula (A), Y is a single bond, —$(CH_2)_2$—, —COO—, —OCO—, —$CH_2O$—, —$OCH_2$—, —$CF_2O$—, —$OCF_2$—, —CH=CH—, —CF=CF—, —$(CH_2)_4$—, —$(CH_2)_3$O—, —O—$(CH_2)_3$—, —CH=CH—$(CH_2)_2$—, —$(CH_2)_2$—CH=CH—, —$(CH_2)_2CF_2O$—, —$OCF_2(CH_2)_2$—, —$(CH_2)_2$COO—, —$(CH_2)_2$OCO—, —$COO(CH_2)_2$—, —$OCO(CH_2)_2$—, —CH=CH—COO—, —CH=CH—OCO—, —COO—CH=CH— or —OCO—CH=CH—. In formula (A), n is 1, 2, 3 or 4.

However, the compounds disclosed in Japanese Patent Nos. 2,811,342 and 1,761,492, in which hydrogen on a benzene ring is replaced by fluorine, are poor in compatibility with other liquid crystal compounds in a low temperature range and may not be used in a liquid crystal composition in a low temperature range.

JP S60-199840 A/1985 discloses the first component of the invention, and DE 3906058 C2 discloses in Example 24 a synthesis example of a compound of formula (1-1) as the first component. JP 2005-314598 A discloses a composition containing the first component of the invention. However, there are cases where the composition is poor in compatibility at a low temperature range and is not favorable as a liquid crystal composition.

A liquid crystal display device having such an operation mode as an IPS mode, a VA mode and so forth still has a problem as a display device in comparison to a CRT, and the characteristics thereof are demanded for improvement.

A liquid crystal display device driven in an IPS mode or a VA mode contains mainly a liquid crystal composition having a negative dielectric anisotropy, and for further improving the characteristics thereof, the liquid crystal composition is demanded to have the following characteristics (1) to (5), i.e., (1) a wide temperature range of a nematic phase, (2) a low viscosity, (3) a suitable optical anisotropy, (4) a large absolute value of a dielectric anisotropy, and (5) a large specific resistance.

The temperature range of a nematic phase relates to a temperature range where the liquid crystal display device is used, and a liquid crystal display device containing a liquid crystal composition having a wide temperature range of a nematic phase as in the item (1) has a wide temperature range where the liquid crystal display device can be used.

A liquid crystal display device containing a liquid crystal composition having a small viscosity as in the item (2) has a short response time. A liquid crystal display device having a short response time can be favorably used for displaying a moving image. Furthermore, upon injecting the liquid crystal composition into a liquid crystal cell of the liquid crystal display device, the injection time can be reduced to improve the workability.

A liquid crystal display device containing a liquid crystal composition having a suitable optical anisotropy as in the item (3) has a large contrast.

A liquid crystal display device containing a liquid crystal composition having a large absolute value of a dielectric anisotropy as in the item (4) reduces a threshold voltage, decreases a driving voltage, and reduces an electric power consumption.

A liquid crystal display device containing a liquid crystal composition having a large specific resistance as in the item (5) increases a voltage holding ratio and increases a contrast ratio. Accordingly, such a liquid crystal composition is preferred that has a large specific resistance in the initial stage and has a large specific resistance even after using for a long period of time.

SUMMARY OF THE INVENTION

The invention concerns a liquid crystal composition having a negative dielectric anisotropy that includes two components, wherein the first component is at least one compound selected from the group of compounds represented by formulas (1-1) and (1-2), and the second component is at least one compound selected from the group of compounds represented by formulas (2-1) to (2-3):

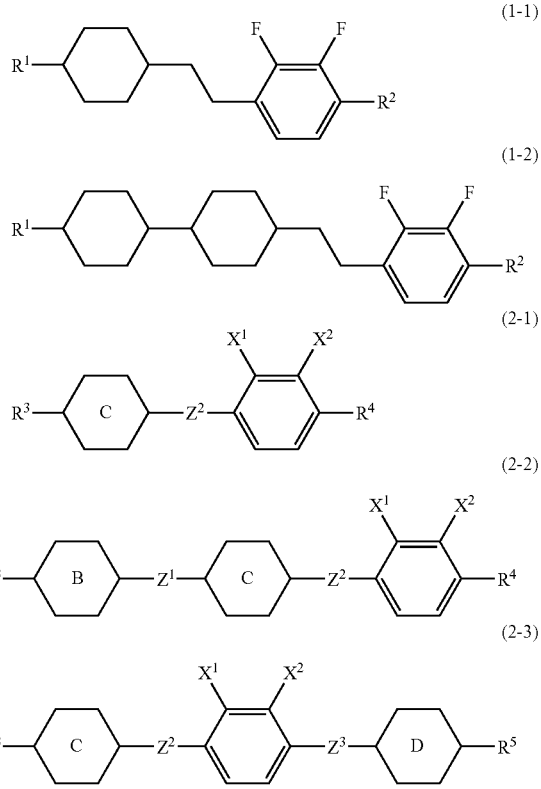

wherein in formulas (1-1) and (1-2) and formulas (2-1) to (2-3), $R^1$ and $R^3$ are each independently alkyl or alkenyl; $R^2$, $R^4$ and $R^5$ are each independently alkyl, alkenyl or alkoxy; ring B, ring C and ring D are each independently 1,4-cyclohexylene or 1,4-phenylene; $Z^1$, $Z^2$ and $Z^3$ are each independently a single bond, —$(CH_2)_2$—, —$CH_2O$— or —$OCH_2$—; and one of $X^1$ and $X^2$ is fluorine, and the other is chlorine.

The invention also concerns a liquid crystal display device that includes the liquid crystal composition, and so forth.

DETAILED DESCRIPTION OF THE INVENTION

One of the advantages of the invention is to provide a liquid crystal composition that has a wide temperature range of a nematic phase, a small viscosity, a suitable optical anisotropy, has a large negative dielectric anisotropy and has a large specific resistance. Another one of the advantages of the invention is to provide a liquid crystal composition that has a large optical anisotropy and has a low minimum temperature of a nematic phase, preferably –20° C. or less, while satisfying the aforementioned characteristics. Still another one of the advantages of the invention is to provide a liquid crystal display device containing the composition that has a large voltage holding ratio and is driven in an active matrix (AM) mode suitable for a VA mode, an IPS mode and so forth.

It has been found that a liquid crystal composition having a negative dielectric anisotropy that contains a liquid crystal compound having an ethylene bond and 2,3-difluorophenylene as a first component and a liquid crystal compound having phenylene having halogens replacing two hydrogens as a second component has a wide temperature range of a nematic phase, a small viscosity, a suitable optical anisotropy, a large negative dielectric anisotropy and a large specific resistance, and also found that a liquid crystal display device that contains the liquid crystal composition has a large voltage holding ratio. Thus, the invention has been completed.

The liquid crystal composition of the invention has a wide temperature range of a nematic phase, a small viscosity, a suitable optical anisotropy, has a large negative dielectric anisotropy and has a large specific resistance. The composition is properly balanced among the characteristics. The liquid crystal composition of the invention can increase an optical anisotropy and can decrease a minimum temperature of a nematic phase, preferably –20° C. or less. The liquid crystal composition of the invention can preferably have an optical anisotropy in a range of from 0.07 to 0.20 and a dielectric anisotropy in a range of from –5.0 to –2.0. The liquid crystal display device of the invention contains the composition and has a high voltage holding ratio. The liquid crystal display device contains the composition having the aforementioned characteristics and thus can be suitably used as a liquid crystal display device driven in an active matrix (AM) mode (which is hereinafter referred to as an AM device in some cases) having such an operation mode as a VA mode, an IPS mode and so forth.

The invention has the following features:

1. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1) to (2-3):

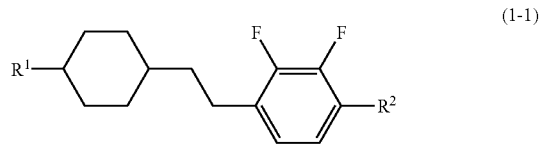

(1-2)
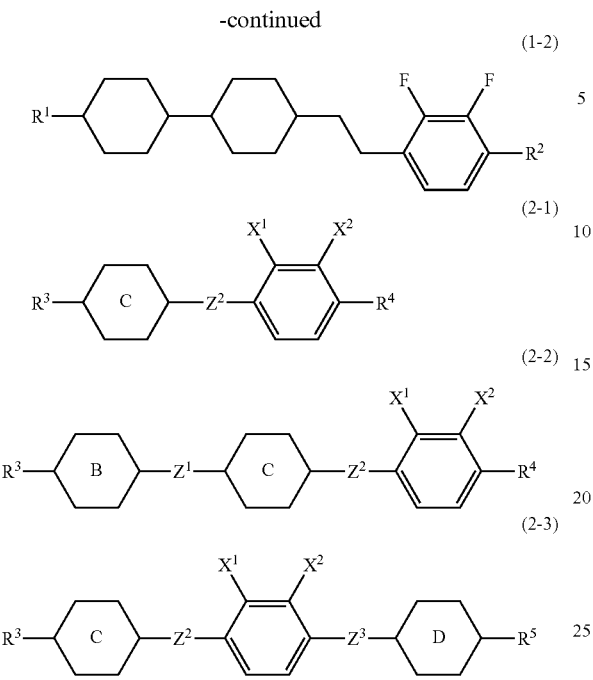
(2-1)
(2-2)
(2-3)

wherein in formulas (1-1) and (1-2) and formulas (2-1) to (2-3), $R^1$ and $R^3$ are each independently alkyl or alkenyl;

$R^2$, $R^4$ and $R^5$ are each independently alkyl, alkenyl or alkoxy; ring B, ring C and ring D are each independently 1,4-cyclohexylene or 1,4-phenylene;

$Z^1$, $Z^2$ and $Z^3$ are each independently a single bond, —$(CH_2)_2$—, —$CH_2O$— or —$OCH_2$—; and one of $X^1$ and $X^2$ is fluorine, and the other is chlorine.

2. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1-1), (2-2-1) and (2-3-1):

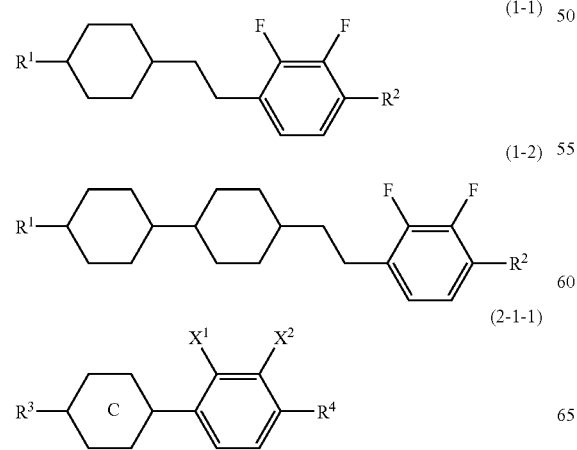

(1-1)
(1-2)
(2-1-1)
(2-2-1)
(2-3-1)

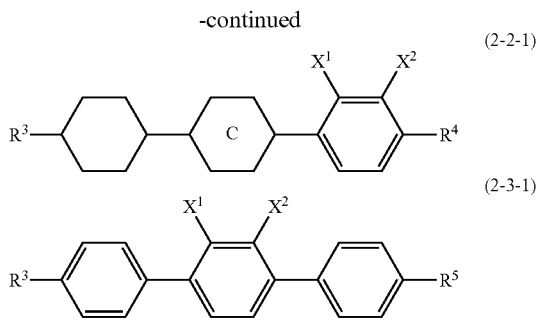

wherein in formulas (1-1) and (1-2) and formulas (2-1-1), (2-2-1) and (2-3-1), $R^1$ and $R^3$ are each independently alkyl or alkenyl;

$R^2$, $R^4$ and $R^5$ are each independently alkyl, alkenyl or alkoxy; ring C is independently 1,4-cyclohexylene or 1,4-phenylene; and one of $X^1$ and $X^2$ is fluorine, and the other is chlorine.

3. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1-1-1) to (2-1-1-4) and (2-2-1-1) to (2-2-1-4):

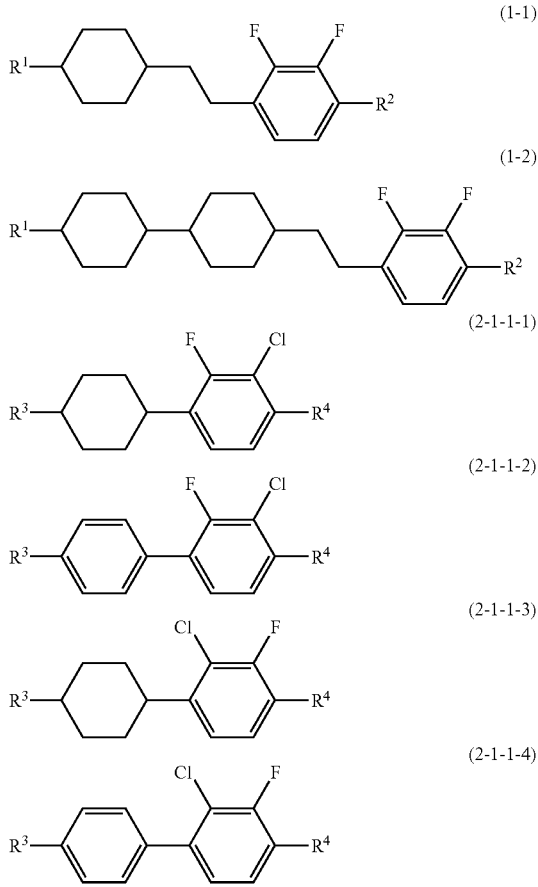

(1-1)
(1-2)
(2-1-1-1)
(2-1-1-2)
(2-1-1-3)
(2-1-1-4)

-continued

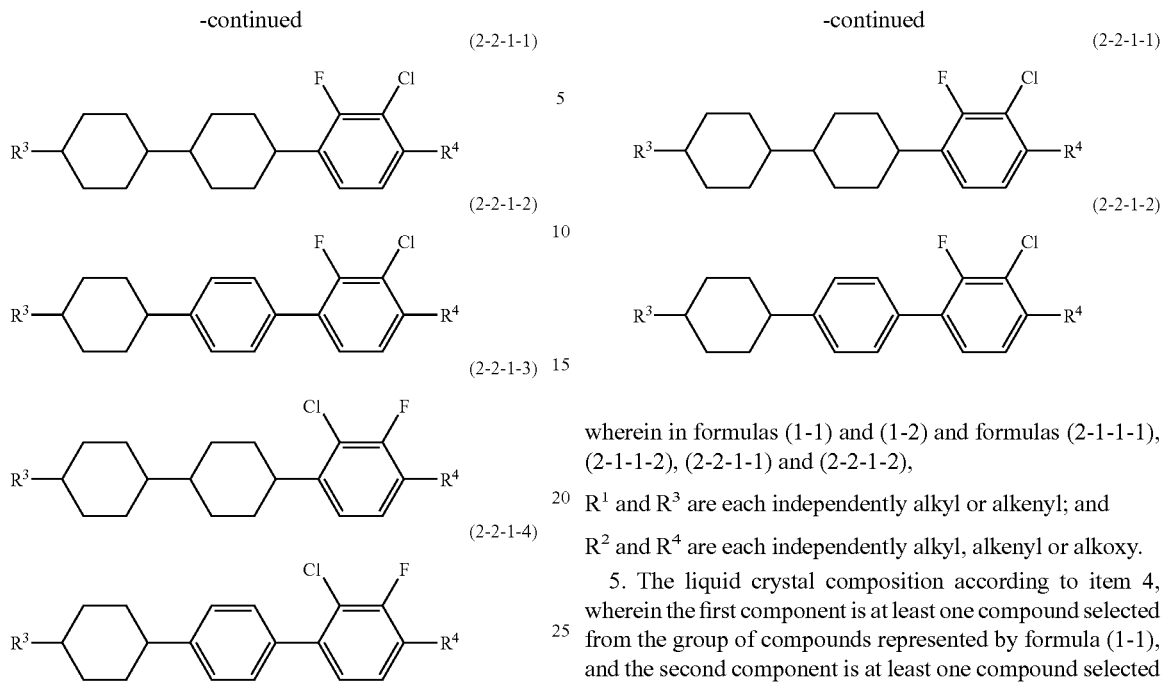

wherein in formulas (1-1) and (1-2) and formulas (2-1-1-1) to (2-1-1-4) and (2-2-1-1) to (2-2-1-4), $R^1$ and $R^3$ are each independently alkyl or alkenyl; and $R^2$ and $R^4$ are each independently alkyl, alkenyl or alkoxy.

4. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1-1-1), (2-1-1-2), (2-2-1-1) and (2-2-1-2):

wherein in formulas (1-1) and (1-2) and formulas (2-1-1-1), (2-1-1-2), (2-2-1-1) and (2-2-1-2), $R^1$ and $R^3$ are each independently alkyl or alkenyl; and $R^2$ and $R^4$ are each independently alkyl, alkenyl or alkoxy.

5. The liquid crystal composition according to item 4, wherein the first component is at least one compound selected from the group of compounds represented by formula (1-1), and the second component is at least one compound selected from the group of compounds represented by formulas (2-2-1-1) and (2-2-1-2).

6. The liquid crystal composition according to item 4, wherein the first component is at least one compound selected from the group of compounds represented by formula (1-2), and the second component is at least one compound selected from the group of compounds represented by formulas (2-1-1-1) and (2-1-1-2).

7. The liquid crystal composition according to item 4, wherein the first component is a mixture of at least one compound selected from the group of compounds represented by formula (1-1) and at least one compound selected from the group of compounds represented by formula (1-2), and the second component is at least one compound selected from the group of compounds represented by formulas (2-2-1-1) and (2-2-1-2).

8. The liquid crystal composition according to item 4, wherein the first component is a mixture of at least one compound selected from the group of compounds represented by formula (1-1) and at least one compound selected from the group of compounds represented by formula (1-2), and the second component is a mixture of at least one compound selected from the group of compounds represented by formulas (2-1-1-1) and (2-1-1-2) and at least one compound selected from the group of compounds represented by formulas (2-2-1-1) and (2-2-1-2).

9. The liquid crystal composition according to any one of items 1 to 8, wherein a content ratio of the first component is from 20% to 70% by weight, and a content ratio of the second component is from 10% to 70% by weight, based on the total weight of the liquid crystal compounds.

10. The liquid crystal composition according to any one of items 1 to 9, wherein the composition further comprises, in addition to the first component and the second component, at least one compound selected from the group of compounds represented by formula (3) as a third component:

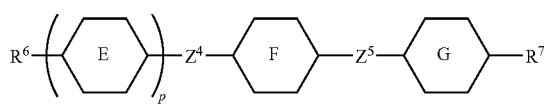

wherein in formula (3), $R^6$ is independently alkyl or alkenyl;

$R^7$ is independently alkyl, alkenyl or alkoxy;

ring E, ring F and ring G are each independently 1,4-cyclohexylene, 1,4-phenylene, 2-fluoro-1,4-phenylene or 3-fluoro-1,4-phenylene;

$Z^4$ and $Z^5$ are each independently a single bond, —$(CH_2)_2$—, —$CH_2O$—, —$OCH_2$—, —COO— or —OCO—; and P is 0 or 1.

11. The liquid crystal composition according to item 10, wherein the third component is at least one compound selected from the group of compounds represented by formulas (3-1) to (3-7):

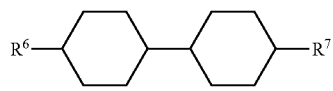
(3-1)

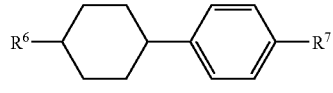
(3-2)

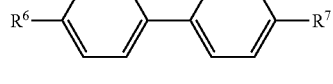
(3-3)

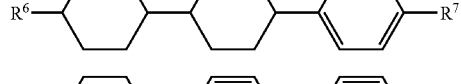
(3-4)

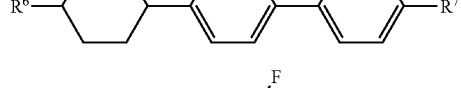
(3-5)

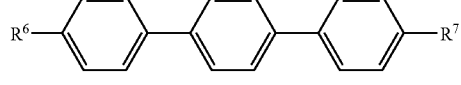
(3-6)

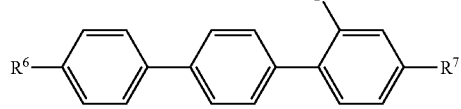
(3-7)

wherein in formulas (3-1) to (3-7), $R^6$ is independently alkyl or alkenyl; and $R^7$ is independently alkyl, alkenyl or alkoxy.

12. The liquid crystal composition according to item 10 or 11, wherein the third component is at least one compound selected from the group of compounds represented by formulas (3-1), (3-2), (3-4) and (3-6).

13. The liquid crystal composition according to any one of items 10 to 12, wherein a content ratio of the first component is from 20% to 70% by weight, a content ratio of the second component is from 5% to 70% by weight, and a content ratio of the third component is from 10% to 50% by weight, based on the total weight of the liquid crystal compounds.

14. The liquid crystal composition according to any one of items 10 to 13, wherein the composition comprises three components, wherein the first component is at least one compound selected from the group of compounds represented by formulas (1-1) and (1-2), the second component is at least one compound selected from the group of compounds represented by formulas (2-1-1-1) to (2-1-1-4) and (2-2-1-1) to (2-2-1-4), and the third component is at least one compound selected from the group of compounds represented by formulas (3-1), (3-2), (3-4) and (3-6).

15. The liquid crystal composition according to any one of items 10 to 14, wherein the first component is at least one compound selected from the group of compounds represented by formula (1-1), the second component is at least one compound selected from the group of compounds represented by formulas (2-2-1-1) and (2-2-1-2), and the third component is at least one compound selected from the group of compounds represented by formulas (3-1), (3-2), (3-4) and (3-6).

16. The liquid crystal composition according to any one of items 10 to 14, wherein the first component is at least one compound selected from the group of compounds represented by formula (1-2), the second component is at least one compound selected from the group of compounds represented by formulas (2-1-1-1) and (2-1-1-2), and the third component is at least one compound selected from the group of compounds represented by formulas (3-1), (3-2), (3-4) and (3-6).

17. The liquid crystal composition according to any one of items 10 to 14, wherein the first component is a mixture of at least one compound selected from the group of compounds represented by formula (1-1) and at least one compound selected from the group of compounds represented by formula (1-2), the second component is at least one compound selected from the group of compounds represented by formulas (2-2-1-1) and (2-2-1-2), and the third component is at least one compound selected from the group of compounds represented by formulas (3-1), (3-2), (3-4) and (3-6).

18. The liquid crystal composition according to any one of items 14 to 17, wherein a content ratio of the first component is from 25% to 70% by weight, a content ratio of the second component is from 10% to 65% by weight, and a content ratio of the third component is from 10% to 50% by weight, based on the total weight of the liquid crystal compounds.

19. The liquid crystal composition according to any one of items 1 to 18, wherein the composition further comprises, in addition to the first component, the second component and the third component, at least one compound selected from the group of compounds represented by formulas (4-1) to (4-4) as a fourth component:

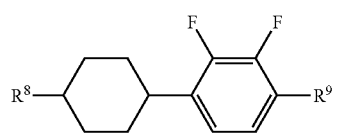
(4-1)

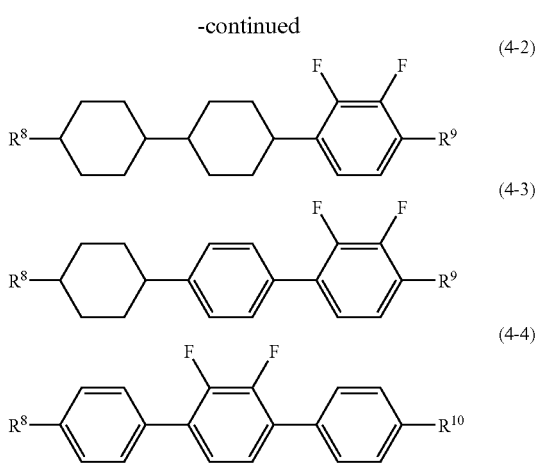

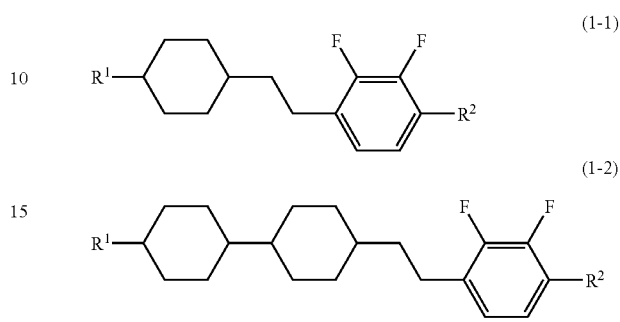

wherein in formulas (4-1) to (4-4), $R^8$ is independently alkyl or alkenyl; and $R^9$ and $R^{10}$ are each independently alkyl, alkenyl or alkoxy.

20. The liquid crystal composition according to item 19, wherein the composition comprises four components, wherein the first component is at least one compound selected from the group of compounds represented by formulas (1-1) and (1-2), the second component is at least one compound selected from the group of compounds represented by formulas (2-1-1-1) to (2-1-1-4) and (2-2-1-1) to (2-2-1-4), the third component is at least one compound selected from the group of compounds represented by formulas (3-1), (3-2), (3-4) and (3-6), and the fourth component is at least one compound selected from the group of compounds represented by formulas (4-1), (4-2) and (4-3).

21. The liquid crystal composition according to item 19 or 20, wherein a content ratio of the first component is from 25% to 70% by weight, a content ratio of the second component is from 10% to 55% by weight, a content ratio of the third component is from 10% to 50% by weight, and a content ratio of the fourth component is from 10% to 55% by weight, based on the total weight of the liquid crystal compounds.

22. The liquid crystal composition according to any one of items 1 to 21, wherein the composition has an optical anisotropy in a range of from 0.07 to 0.16.

23. The liquid crystal composition according to any one of items 1 to 22, wherein the composition has a dielectric anisotropy in a range of from −5.0 to −2.0.

24. A liquid crystal display device comprising the liquid crystal composition according to any one of items 1 to 23.

25. The liquid crystal display device according to item 24, wherein the liquid crystal display device has an operation mode of a VA mode or an IPS mode and a driving mode of an active matrix mode.

The liquid crystal composition of the invention contains a liquid crystal compound having an ethylene bond and 2,3-difluorophenylene as the first component, a liquid crystal compound having phenylene having halogens replacing two hydrogens as the second component, and depending on necessity liquid crystal compounds having specific structures as the third component and the fourth component.

The components will be described below for structures of compounds used as the components, characteristics and advantages of the components, and specific examples and preferred embodiments thereof.

First Component

The first component of the liquid crystal composition of the invention is at least one liquid crystal compound having an ethylene bond and 2,3-difluorophenylene represented by formulas (1-1) and (1-2):

In formulas (1-1) and (1-2), independently, $R^1$ and $R^2$ are defined as follows.

$R^1$ is independently alkyl or alkenyl; and $R^2$ is independently alkyl, alkenyl or alkoxy.

In the alkyl, alkyl having 1 to 20 carbons is preferred; alkyl having 1 to 10 carbons is more preferred; methyl, ethyl, propyl, butyl, pentyl, hexyl, heptyl and octyl are further preferred; and ethyl, propyl, butyl, pentyl and heptyl are particularly preferred.

In the alkenyl, alkenyl having 2 to 20 carbons is preferred; alkenyl having 2 to 10 carbons is more preferred; vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl are further preferred; and vinyl, 1-propenyl, 3-butenyl and 3-pentenyl are particularly preferred.

In the case where $R^1$ or $R^2$ is the alkenyl, a preferred configuration of —CH=CH— in the alkenyl depends on the position of the double bond. In the case where $R^1$ or $R^2$ is a group, in which the position number of carbon where the double bond starts is an odd number, for example, 1-propenyl, 1-butenyl, 1-pentenyl, 1-hexenyl, 3-pentenyl or 3-hexenyl, a trans configuration is preferred. In the case where $R^1$ or $R^2$ is a group, in which the position number of carbon where the double bond starts is an even number, for example, 2-butenyl, 2-pentenyl, 2-hexenyl or 4-hexenyl, acid configuration is preferred.

In the alkoxy, alkoxy having 1 to 20 carbons is preferred; alkoxy having 1 to 10 carbons is more preferred; methoxy, ethoxy, propoxy, butoxy, pentyloxy, hexyloxy and heptyloxy are further preferred; and methoxy, ethoxy and butoxy are particularly preferred.

The compound represented by formulas (1-1) and (1-2) has an ethylene bond and 2,3-difluorophenylene. Owing to the first component having the structure, the liquid crystal composition of the invention has a low minimum temperature of a nematic phase, a large negative dielectric anisotropy and a small viscosity.

The liquid crystal compound represented by formula (1-1) has a low minimum temperature of a nematic phase, a small viscosity, a small optical anisotropy, a large negative dielectric anisotropy and a large specific resistance, as compared to an ordinary liquid crystal compound.

The liquid crystal compound represented by formula (1-2) has a high maximum temperature of a nematic phase, a small to moderate viscosity, a moderate optical anisotropy, a large negative dielectric anisotropy and a large specific resistance, as compared to an ordinary liquid crystal compound.

In the compound represented by formulas (1-1) and (1-2), a compound, in which $R^1$ is independently alkyl, is preferred. A compound, in which $R^2$ is independently alkoxy, is preferred. Among the compounds, a compound represented by formula (1-1) is more preferred.

In the case where the liquid crystal compound as the first component is the aforementioned compound, the liquid crystal composition has a further lower minimum temperature of a nematic phase, a smaller viscosity and a large negative dielectric anisotropy. Particularly, when $R^2$ is alkoxy, the negative dielectric anisotropy can be further increased.

The liquid crystal compound as the first component may be used solely or in combination of plural kinds thereof.

Second Component

The second component of the liquid crystal composition of the invention is at least one liquid crystal compound represented by formulas (2-1) to (2-3):

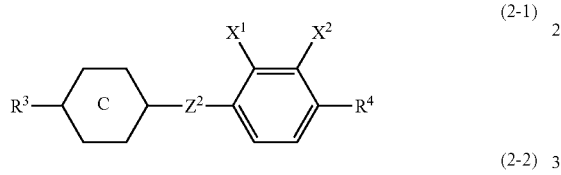
(2-1)

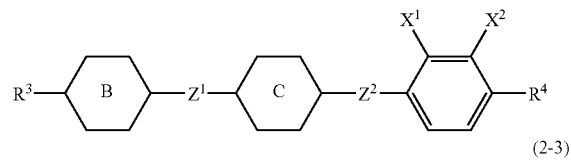
(2-2)

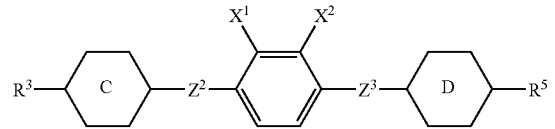
(2-3)

In formulas (2-1) to (2-3), independently, $R^3$, $R^4$, $R^5$, ring B, ring C, ring D, $Z^1$, $Z^2$ and $Z^3$ are defined as follows.

$R^3$ is independently alkyl or alkenyl; and $R^4$ and $R^5$ are each independently alkyl, alkenyl or alkoxy. Preferred embodiments of the alkyl, alkenyl and alkoxy for $R^3$, $R^4$ and $R^5$ are the same as in the cases of $R^1$ and $R^2$.

Among compounds represented by formulas (2-1) to (2-3), a compound, in which $R^3$ and $R^5$ are each independently alkyl, is preferred, and a compound, in which $R^4$ is independently alkyl or alkoxy, is preferred. A compound, in which $R^4$ is alkoxy, is preferred.

Ring B, ring C and ring D are each independently 1,4-cyclohexylene or 1,4-phenylene. In the case where the ring contained in the compound represented by formulas (2-1) to (2-3) is 1,4-cyclohexylene, the configuration thereof is preferably a trans configuration.

$Z^1$, $Z^2$ and $Z^3$ are each independently a single bond, —$(CH_2)_2$—, —$CH_2O$— or —$OCH_2$—.

One of $X^1$ and $X^2$ is fluorine, and the other is chlorine.

Among compounds represented by formulas (2-1) to (2-3), compounds represented by formulas (2-1-1), (2-2-1) and (2-3-1) are preferred:

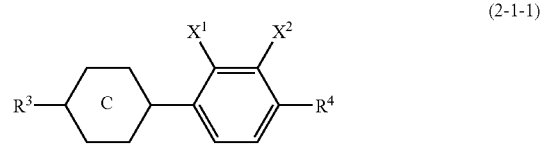
(2-1-1)

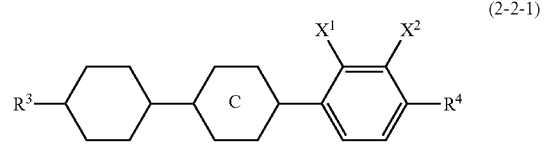
(2-2-1)

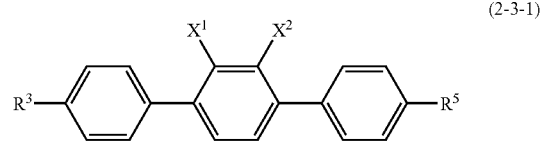
(2-3-1)

In formulas (2-1-1), (2-2-1) and (2-3-1), $R^3$, $R^4$, $R^5$ and ring C are defined as follows.

$R^3$, $R^4$ and $R^5$ are each independently alkyl, alkenyl or alkoxy; and ring C is independently 1,4-cyclohexylene or 1,4-phenylene.

One of $X^1$ and $X^2$ is fluorine, and the other is chlorine.

The compound represented by formulas (2-1-1), (2-2-1) and (2-3-1) has 1,4-phenylene, in which one of hydrogens at the 2- and 3-positions is replaced by fluorine, and the other hydrogen is replaced by chlorine. In the case where the liquid crystal compound as the second component has the structure, the liquid crystal composition of the invention has a large negative dielectric anisotropy.

Among compounds represented by formulas (2-1-1), (2-2-1) and (2-3-1), compounds represented by formulas (2-1-1-1) to (2-1-1-4) and (2-2-1-1) to (2-2-1-4) are preferred:

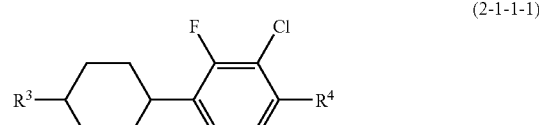
(2-1-1-1)

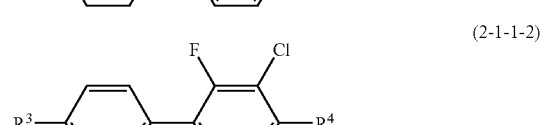
(2-1-1-2)

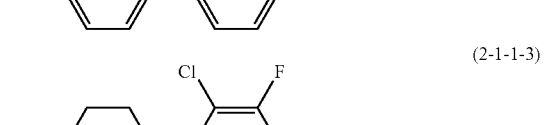
(2-1-1-3)

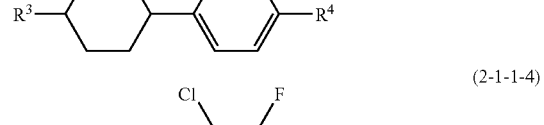
(2-1-1-4)

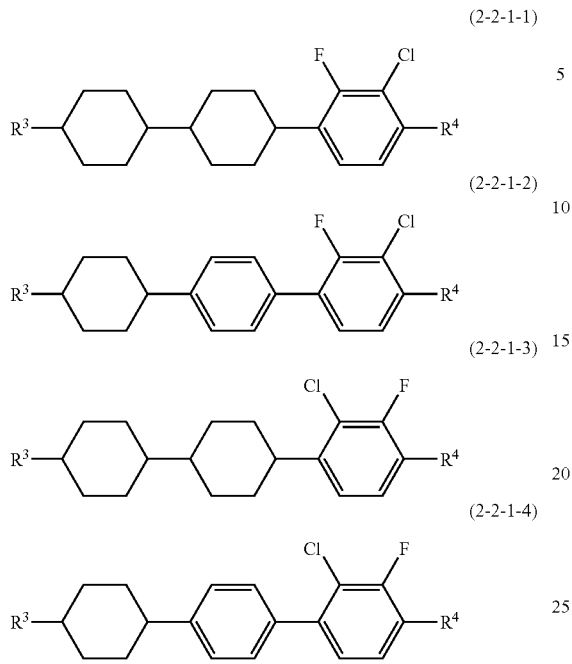

In formulas (2-1-1-1) to (2-1-1-4) and (2-2-1-1) to (2-2-1-4), $R^3$ and $R^4$ are defined as follows.

$R^3$ and $R^4$ are each independently alkyl, alkenyl or alkoxy.

Among the compounds, the liquid crystal compound represented by formulas (2-1-1-1) to (2-1-1-4) has a moderate viscosity, a small to moderate optical anisotropy, a moderate to large negative dielectric anisotropy and a large specific resistance, while the maximum temperature of a nematic phase is not necessarily high, as compared to an ordinary liquid crystal compound.

Among the compounds, the liquid crystal compound represented by formulas (2-2-1-1) to (2-2-1-4) has a moderate to high maximum temperature of a nematic phase, a large viscosity, a moderate to large optical anisotropy, a large negative dielectric anisotropy and a large specific resistance, as compared to an ordinary liquid crystal compound.

Among the compounds represented by formulas (2-1-1-1) to (2-1-1-4) and (2-2-1-1) to (2-2-1-4), compounds represented by formulas (2-1-1-1), (2-1-1-2), (2-2-1-1) and (2-2-1-2) are preferred. In the case where the second component is the compound, the liquid crystal composition has a low minimum temperature of a nematic phase and a large negative dielectric anisotropy. In the case where $R^4$ is alkoxy, particularly, the negative dielectric anisotropy can be further increased.

Examples of the compounds represented by formulas (2-1) to (2-3) other than the preferred compounds include the following compounds.

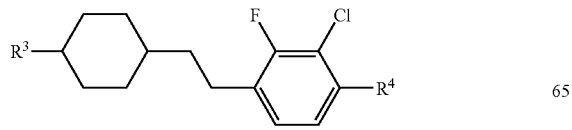

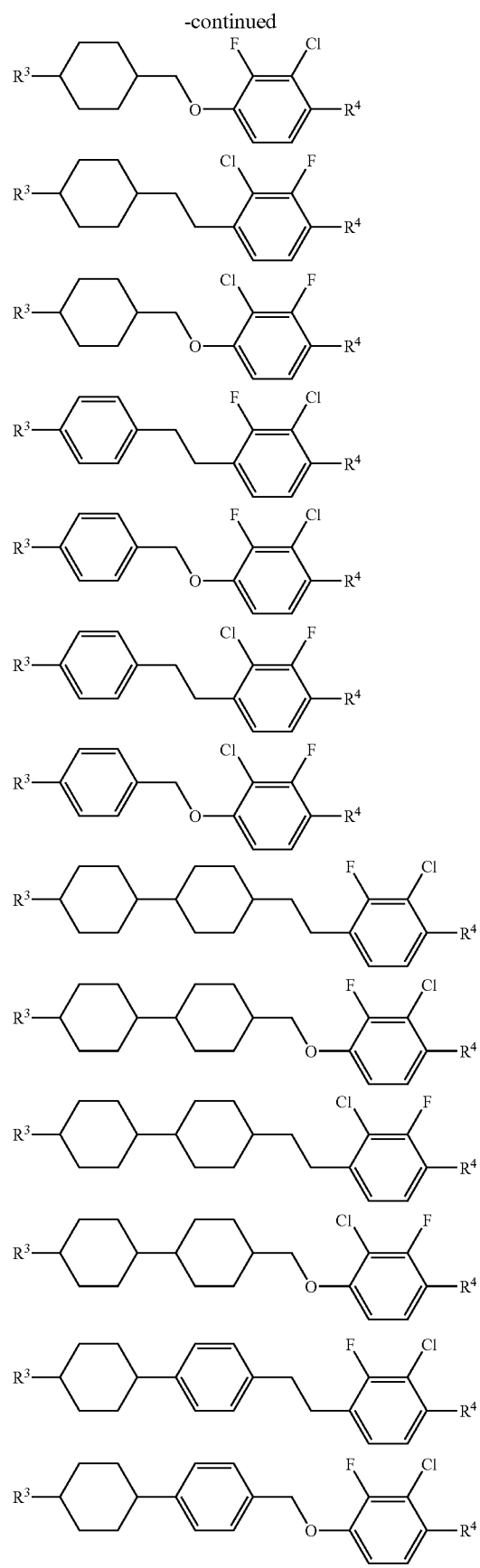

-continued

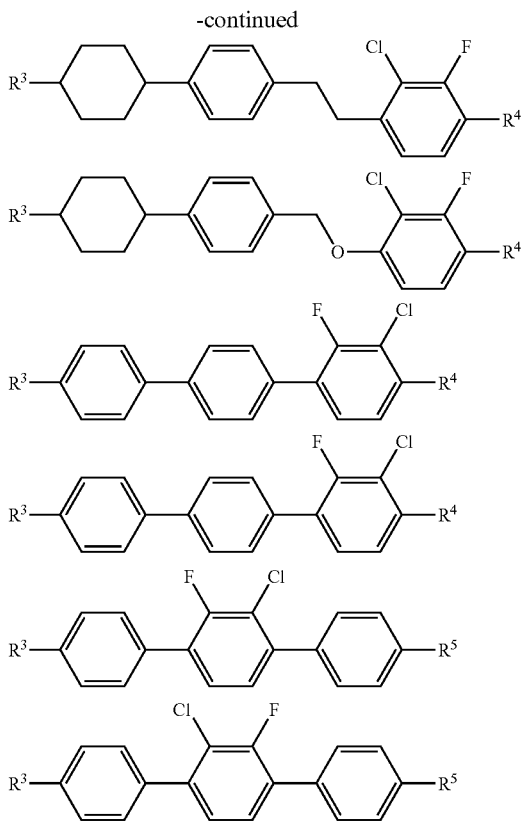

The second component used in the liquid crystal composition of the invention may be one compound represented by formulas (2-1) to (2-3), in which $X^1$ is chlorine, and $X^2$ is fluorine, and may be two or more compounds represented by formulas (2-1) to (2-3), in which $X^1$ is chlorine, and $X^2$ is fluorine.

The second component used in the liquid crystal composition of the invention may be one compound represented by formulas (2-1) to (2-3), in which $X^1$ is fluorine, and $X^2$ is chlorine, and may be two or more compounds represented by formulas (2-1) to (2-3), in which $X^1$ is fluorine, and $X^2$ is chlorine.

The second component used in the liquid crystal composition of the invention may be a mixture of a compound represented by formulas (2-1) to (2-3), in which $X^1$ is chlorine, and $X^2$ is fluorine, and a compound represented by formulas (2-1) to (2-3), in which $X^1$ is fluorine, and $X^2$ is chlorine. In this case, the liquid crystal composition may have a low minimum temperature of a nematic phase.

Among the cases, a liquid crystal composition using a mixture of a compound represented by formulas (2-1) to (2-3), in which $X^1$ is chlorine, and $X^2$ is fluorine, and a compound represented by formulas (2-1) to (2-3), in which $X^1$ is fluorine, and $X^2$ is chlorine, as the second component may have a low minimum temperature of a nematic phase.

Third Component

The liquid crystal composition of the invention may contain, depending on necessity, at least one compound represented by formula (3) as a third component:

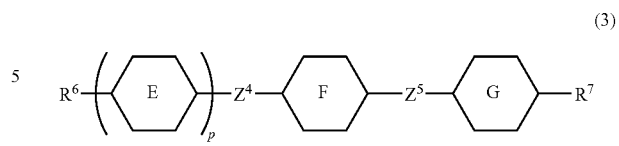

In formula (3), $R^6$ is independently alkyl or alkenyl; and $R^7$ is independently alkyl, alkenyl or alkoxy. Preferred embodiments of $R^6$ are the same as $R^1$ in the compound represented by formula (1-1) as the first component. Preferred embodiments of $R^7$ are the same as $R^2$ in the compound represented by formula (1-2) as the first component.

Ring E, ring F and ring G are each independently 1,4-cyclohexylene, 1,4-phenylene, 2-fluoro-1,4-phenylene or 3-fluoro-1,4-phenylene. $Z^4$ and $Z^5$ are each independently a single bond, —(CH$_2$)$_2$—, —CH$_2$O—, —OCH$_2$—, —COO— or —OCO—. P is 0 or 1.

Owing to the third component having the structure, the liquid crystal composition of the invention has a small viscosity. The maximum temperature of a nematic phase and the optical anisotropy of the liquid crystal composition can be easily controlled by changing the content ratio of the third component with respect to the total weight of the liquid crystal compounds.

Preferred examples of the compound represented by formula (3) include compounds represented by formulas (3-1) to (3-7):

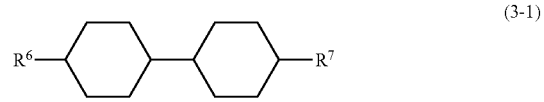

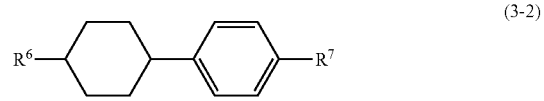

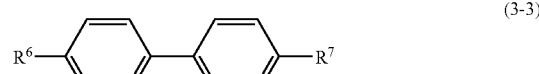

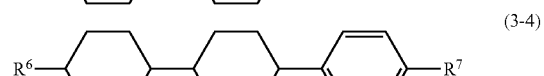

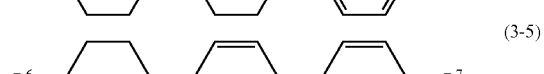

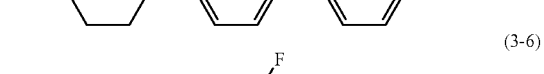

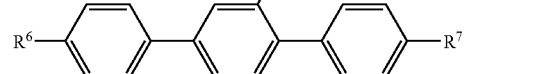

In formulas (3-1) to (3-7), $R^6$ and $R^7$ are the same as in the compound represented by formula (3).

Among the compounds, a liquid crystal compound represented by formulas (3-1) to (3-3) has a small viscosity, a small to large optical anisotropy, a significantly small negative dielectric anisotropy and a large specific resistance, while the maximum temperature of a nematic phase is not significantly high, as compared to an ordinary liquid crystal compound.

Among the compounds, a liquid crystal compound represented by formulas (3-4) and (3-5) has a high maximum temperature of a nematic phase, a small viscosity, a moderate to large optical anisotropy, a significantly small negative dielectric anisotropy and a large specific resistance, as compared to an ordinary liquid crystal compound.

Among the compounds, a liquid crystal compound represented by formulas (3-6) and (3-7) has a high maximum temperature of a nematic phase, a moderate viscosity, a large optical anisotropy, a small negative dielectric anisotropy and a large specific resistance, as compared to an ordinary liquid crystal compound.

Among the compounds, a compound represented by formulas (3-1), (3-2) and (3-4) is preferred since the liquid crystal composition has a low minimum temperature of a nematic phase and a further smaller viscosity.

Among the compounds, a compound represented by formula (3-6) is preferred since the liquid crystal composition has a low minimum temperature of a nematic phase, a large optical anisotropy and a small viscosity.

The liquid crystal compounds as the third component may be used solely or in combination of plural kinds thereof.

Fourth Component

The fourth component of the liquid crystal composition of the invention is at least one compound represented by formulas (4-1) to (4-4):

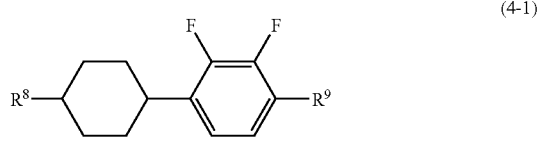

(4-1)

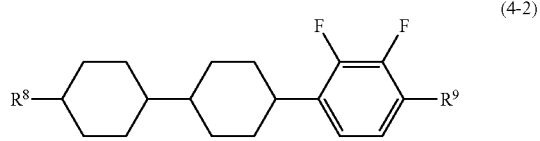

(4-2)

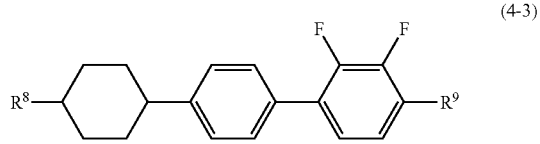

(4-3)

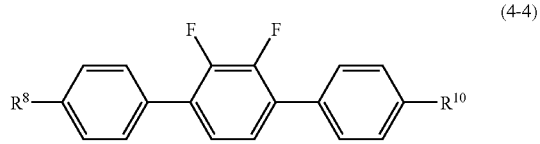

(4-4)

In formulas (4-1) to (4-4), independently, $R^8$, $R^9$ and $R^{10}$ are defined as follows.

$R^8$ is independently alkyl, alkenyl or alkoxy; and $R^9$ and $R^{10}$ are each independently alkyl, alkenyl or alkoxy. Preferred embodiments of $R^8$ are the same as alkyl of $R^1$ in the compound represented by formulas (1-1) and (1-2) as the first component. Preferred embodiments of $R^9$ and $R^{10}$ are the same as alkyl, alkenyl and alkoxy of $R^2$ in the compound represented by formulas (1-1) and (1-2) as the first component.

The compound represented by formulas (4-1) to (4-4) has 2,3-difluoro-1,4-phenylene. Owing to the fourth component having the structure, the liquid crystal composition of the invention has a large negative dielectric anisotropy.

Among the compounds, the liquid crystal compound represented by formula (4-1) has a moderate to relatively large viscosity, a moderate optical anisotropy, a moderate to relatively large negative dielectric anisotropy and a large specific resistance, while the maximum temperature of a nematic phase is not necessarily high, as compared to an ordinary liquid crystal compound.

Among the compounds, the liquid crystal compound represented by formula (4-2) has a moderate to high maximum temperature of a nematic phase, a large viscosity, a moderate optical anisotropy, a large negative dielectric anisotropy and a large specific resistance, as compared to an ordinary liquid crystal compound.

Among the compounds, the liquid crystal compound represented by formula (4-3) has a moderate to high maximum temperature of a nematic phase, a large viscosity, a large optical anisotropy, a large negative dielectric anisotropy and a large specific resistance, as compared to an ordinary liquid crystal compound.

Among the compounds, the liquid crystal compound represented by formula (4-4) has a moderate maximum temperature of a nematic phase, a large viscosity, a large optical anisotropy, a large negative dielectric anisotropy and a large specific resistance, as compared to an ordinary liquid crystal compound.

Among compounds represented by formulas (4-1) to (4-4), compounds represented by formulas (4-1), (4-2) and (4-3) are preferred.

In the case where the fourth component is the compound, the liquid crystal composition has a large negative dielectric anisotropy. In the case where $R^9$ is alkoxy, particularly, the negative dielectric anisotropy can be further increased.

The liquid crystal compounds as the fourth component may be used solely or in combination of plural kinds thereof.

Synthesis Method of Liquid Crystal Compound

Synthesis methods of the liquid crystal compounds used in the liquid crystal composition of the invention will be described.

The compound of the first component, which is exemplified by the compound represented by formula (1-1), can be synthesized according to the method disclosed in DE 3906058 C2.

The compound of the second component, which is exemplified by the compounds represented by formulas (2-2-1-1) and (2-2-1-2), can be synthesized according to the methods disclosed in JP 2005-59154 A.

The compound of the third component represented by formulas (3) and so forth, which is exemplified by the compounds represented by formula (3-1), can be synthesized according to the methods disclosed in JP S59-70624 A/1984 and JP S60-16940 A/1985.

The compound of the fourth component represented by formulas (4-1), (4-2) and (4-3) can be synthesized according to the methods disclosed in Japanese Patent Nos. 2,811,342 and 1,761,492.

The compounds that cannot be synthesized according to the aforementioned literatures can be synthesized according to the methods disclosed in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth.

The combinations of the components and preferred content ratios of the components in the composition will be described. The components are each preferably a mixture containing plural compounds rather than a sole compound since the minimum temperature of a nematic phase can be decreased.

Liquid Crystal Composition (1)

The liquid crystal composition of the invention contains the first component and the second component (which is hereinafter referred to as a liquid crystal composition (1) in some cases).

Owing to the combination of the components, the liquid crystal composition has a low minimum temperature of a nematic phase and a large negative dielectric anisotropy.

In the liquid crystal composition (1) of the invention, while the content ratios of the first component and the second component are not particularly limited, it is preferred that the content ratio of the first component is from 10% to 80% by weight, and the content ratio of the second component is from 5% to 80% by weight, based on the total weight of the liquid crystal compounds, it is more preferred that the content ratio of the first component is from 20% to 70% by weight, and the content ratio of the second component is from 10% to 70% by weight, based on the total weight of the liquid crystal compounds, and it is further preferred that the content ratio of the first component is from 30% to 50% by weight, and the content ratio of the second component is from 50% to 70% by weight, based on the total weight of the liquid crystal compounds.

In the case where the content ratios of the first component and the second component are in the aforementioned ranges, the liquid crystal composition has a dielectric anisotropy in a suitable range and has a low minimum temperature of a nematic phase.

In the case where the content ratios of the first component and the second component are in the aforementioned ranges, the content ratios of the compounds as the first component are each 20% by weight or less per one compound, preferably the content ratios of the compounds represented by formula (1-2) are each 10% by weight or less per one compound, and the content ratios of the compounds as the second component are each 15% by weight or less per one compound, preferably the content ratios of the compounds represented by formula (2-2) are each 10% by weight or less per one compound, and the content ratios of the compounds represented by formula (2-3) are each 5% by weight or less per one compound, the minimum temperature of a nematic phase of the liquid crystal composition can be easily controlled to −20° C. or less.

Liquid Crystal Composition (2)

The liquid crystal composition of the invention preferably contains the third component in addition to the first component and the second component (which is hereinafter referred to as a liquid crystal composition (2) in some cases). Owing to the combination of the components, the liquid crystal composition has a wide temperature range of a nematic phase, a dielectric anisotropy in a suitable range and a small viscosity.

In the liquid crystal composition (2) of the invention, while the content ratios of the first component, the second component and the third component are not particularly limited, it is preferred that the content ratio of the first component is from 20% to 70% by weight, the content ratio of the second component is from 5% to 70% by weight, and the content ratio of the third component is from 10% to 50% by weight, based on the total weight of the liquid crystal compounds, it is more preferred that the content ratio of the first component is from 25% to 70% by weight, the content ratio of the second component is from 10% to 65% by weight, and the content ratio of the third component is from 10% to 50% by weight, based on the total weight of the liquid crystal compounds, and it is further preferred that the content ratio of the first component is from 25% to 50% by weight, the content ratio of the second component is from 10% to 40% by weight, and the content ratio of the third component is from 20% to 40% by weight, based on the total weight of the liquid crystal compounds.

In the case where the content ratios of the first component, the second component and the third component of the liquid crystal composition (2) are in the aforementioned ranges, the liquid crystal composition has a wide temperature range of a nematic phase, an optical anisotropy in a suitable range, a dielectric anisotropy in a suitable range and a small viscosity.

In the case where the content ratios of the first component, the second component and the third component are in the aforementioned ranges, the content ratios of the compounds as the first component are each 20% by weight or less per one compound, preferably the content ratios of the compounds represented by formula (1-2) are each 10% by weight or less per one compound, the content ratios of the compounds as the second component are each 15% by weight or less per one compound, preferably the content ratios of the compounds represented by formula (2-2) are each 10% by weight or less per one compound, and the content ratios of the compounds represented by formula (2-3) are each 5% by weight or less per one compound, and the content ratios of the compounds as the third component are each 30% by weight or less per one compound, preferably the content ratios of the compounds represented by formulas (3-4) to (3-7) are each 10% by weight or less per one compound, the minimum temperature of a nematic phase of the liquid crystal composition can be easily controlled to −20° C. or less.

Liquid Crystal Composition (3)

The liquid crystal composition of the invention preferably contains the fourth component in addition to the first component, the second component and the third component (which is hereinafter referred to as a liquid crystal composition (3) in some cases). Owing to the combination of the components, the liquid crystal composition has a wide temperature range of a nematic phase, an optical anisotropy in a suitable range, a dielectric anisotropy in a suitable range, a small viscosity and a large specific resistance.

Owing to the combination of at least one compound having 1,4-phenylene, in which one of hydrogens at the 2- and 3-positions is replaced by fluorine, and the other hydrogen is replaced by chlorine, as the second component, and at least one compound having 2,3-difluorophenylene as the fourth component, the liquid crystal composition has a low minimum temperature of a nematic phase to enhance the temperature range of a nematic phase.

In the liquid crystal composition (3) of the invention, while the content ratios of the first component, the second component, the third component and the fourth component are not particularly limited, it is preferred that the content ratio of the first component is from 20% to 70% by weight, the content ratio of the second component is from 5% to 70% by weight, the content ratio of the third component is from 10% to 40% by weight, and the content ratio of the fourth component is from 5% to 70% by weight, based on the total weight of the liquid crystal compounds, it is more preferred that the content ratio of the first component is from 25% to 70% by weight, the content ratio of the second component is from 10% to 55% by weight, the content ratio of the third component is from 10% to 50% by weight, and the content ratio of the fourth component is from 10% to 55% by weight, based on the total weight of the liquid crystal compounds, and it is further preferred that the content ratio of the first component is from 25% to 50% by weight, the content ratio of the second component is from 10% to 40% by weight, the content ratio of the third component is from 20% to 40% by weight, and the content ratio of the fourth component is from 10% to 40% by weight, based on the total weight of the liquid crystal compounds.

In the case where the content ratios of the first component, the second component, the third component and the fourth component of the liquid crystal composition (3) are in the aforementioned ranges, the liquid crystal composition has a wide temperature range of a nematic phase, an optical anisotropy in a suitable range, a dielectric anisotropy in a suitable range, a small viscosity and a large specific resistance.

In the case where the content ratios of the first component, the second component, the third component and the fourth component are in the aforementioned ranges, the liquid crystal composition has a low minimum temperature of a nematic phase. In the case where the content ratios of the first component, the second component, the third component and the fourth component are in the aforementioned ranges, the content ratios of the compounds as the first component are each 20% by weight or less per one compound, preferably the content ratios of the compounds represented by formula (1-2) are each 10% by weight or less per one compound, the content ratios of the compounds as the second component are each 15% by weight or less per one compound, preferably the content ratios of the compounds represented by formula (2-2) are each 10% by weight or less per one compound, and the content ratios of the compounds represented by formula (2-3) are each 5% by weight or less per one compound, the content ratios of the compounds as the third component are each 30% by weight or less per one compound, preferably the content ratios of the compounds represented by formulas (3-4) to (3-7) are each 10% by weight or less per one compound, and the content ratios of the compounds as the fourth component are each 15% by weight or less per one compound, preferably the content ratios of the compounds represented by formulas (4-2) and (4-3) are each 10% by weight or less per one compound, and the content ratios of the compounds represented by formula (4-4) are each 5% by weight or less per one compound, the minimum temperature of a nematic phase of the liquid crystal composition can be easily controlled to −20° C. or less.

Embodiments and so Forth of Liquid Crystal Composition

The liquid crystal composition of the invention may contain, in addition to the first and second components, and the third component and the fourth component added depending on necessity, another liquid crystal compound in some cases for further controlling the characteristics of the liquid crystal composition. The liquid crystal composition of the invention may not contain any other liquid crystal compound than the first and second components, and the third component and the fourth component added depending on necessity from the standpoint, for example, of cost.

The liquid crystal composition of the invention may further contain an additive, such as an optically active compound, a colorant, an antifoaming agent, an ultraviolet ray absorbent, an antioxidant and so forth.

In the case where an optically active compound is added to the liquid crystal composition of the invention, a helical structure can be induced in the liquid crystal to apply a twist angle thereto.

In the case where a colorant is added to the liquid crystal composition of the invention, the composition can be applied to a liquid crystal display device having a guest host (GH) mode.

In the case where an antifoaming agent is added to the liquid crystal composition of the invention, the liquid crystal composition can be prevented from being foamed during transportation of the liquid crystal composition or during the production process of a liquid crystal display device with the liquid crystal composition.

In the case where an ultraviolet ray absorbent or an antioxidant is added to the liquid crystal composition of the invention, the liquid crystal composition or a liquid crystal display device containing the liquid crystal composition can be prevented from being deteriorated. For example, an antioxidant can suppress the specific resistance from being decreased upon heating the liquid crystal composition.

Examples of the ultraviolet ray absorbent include a benzophenone ultraviolet ray absorbent, a benzoate ultraviolet ray absorbent and a triazole ultraviolet ray absorbent.

Specific examples of the benzophenone ultraviolet ray absorbent include 2-hydroxy-4-octoxybenzophenone.

Specific examples of the benzoate ultraviolet ray absorbent include 2,4-di-tert-butylphenyl-3,5-di-tert-butyl-4-hydroxybenzoate.

Specific examples of the triazole ultraviolet ray absorbent include 2-(2-hydroxy-5-methylphenyl)benzotriazole, 2-(2-hydroxy-3-(3,4,5,6-tetrahydroxyphthalimide-methyl)-5-methylphenyl)benzotriazole and 2-(3-tert-butyl-2-hydroxy-5-methylphenyl)-5-chlorobenzotriazole.

Examples of the antioxidant include a phenol antioxidant and an organic sulfur antioxidant.

Specific examples of the phenol antioxidant include 3,5-di-tert-butyl-4-hydroxytoluene, 2,2'-methylenebis(6-tert-butyl-4-methylphenol), 4,4'-butylidenebis(6-tert-butyl-3-methylphenol), 2,6-di-tert-butyl-4-(2-octadecyloxycarbonyl)ethylphenol and pentaerythritol tetrakis(3-(3,5-di-tert-butyl-4-hydroxyphenyl)propionate).

Specific examples of the organic sulfur antioxidant include dilauryl-3,3'-thiopropionate, dimyristyl-3,3'-thiopropyonate, distearyl-3,3'-thiopropionate, pentaerythritol tetrakis(3-laurylthiopropionate) and 2-mercaptobenzimidazole.

The additives exemplified by an ultraviolet ray absorbent and an antioxidant can be used in such an amount range that the advantages of the addition of the additives are attained, but the advantages of the invention are not impaired. For example, in the case where the ultraviolet ray absorbent is added, the addition amount ratio thereof is generally from 100 ppm to 1,000,000 ppm, preferably from 100 ppm to 10,000 ppm, and more preferably from 1,000 ppm to 10,000 ppm, based on the total weight of the liquid crystal compounds. For example, in the case where the antioxidant is added, the addition amount ratio thereof is generally from 10 ppm to 500 ppm, preferably from 30 ppm to 300 ppm, and more preferably from 40 ppm to 200 ppm, based on the total weight of the liquid crystal compounds.

The liquid crystal composition of the invention may contain, in some cases, impurities, such as a synthesis raw material, a by-product, a reaction solvent and a synthesis catalyst, that are mixed therein during the synthesis process of the compounds constituting the liquid crystal composition and the preparation process of the liquid crystal composition.

Production Method of Liquid Crystal Composition

The liquid crystal composition of the invention can be prepared, for example, by mixing by shaking the component compounds when the compounds are in a liquid state, or by mixing the compounds, which are then melted by heating, followed by shaking, when the compounds contains one in a solid state. The liquid crystal composition of the invention can also be prepared by the other known methods.

Characteristics of Liquid Crystal Composition

The liquid crystal composition of the invention generally has an optical anisotropy in a range of from 0.07 to 0.16. Preferably, a liquid crystal composition having an optical anisotropy in a range of from 0.07 to 0.12 can be obtained. The liquid crystal composition of the invention can have an optical anisotropy in a range of from 0.06 to 0.20 by appropriately controlling the formulation and so forth.

The liquid crystal composition of the invention generally has a dielectric anisotropy in a range of from −5.0 to −2.0, and preferably in a range of from −5.0 to −3.0. The liquid crystal composition having a dielectric anisotropy in the aforementioned ranges can be preferably applied to liquid crystal display devices having an IPS mode and a VA mode.

The liquid crystal composition of the invention generally has both an optical anisotropy in the aforementioned ranges and a dielectric anisotropy in the aforementioned ranges.

In order to maximize a contrast ratio of a liquid crystal display device driven in an IPS mode or a VA mode, it can be designed in such a manner that the product ($\Delta n \cdot d$) of the optical anisotropy ($\Delta n$) of the liquid crystal composition and the cell gap (d) of the liquid crystal display device is a constant value. In a VA mode, the value ($\Delta n \cdot d$) is preferably in a range of from 0.30 to 0.35 μm, and in an IPS mode, the value ($\Delta n \cdot d$) is preferably in a range of from 0.20 μm to 0.30 μm. The cell gap (d) is generally from 3 μm to 6 μm, and therefore, the optical anisotropy of the liquid crystal composition is preferably in a range of from 0.050 to 0.11 in order to maximize the contrast ratio.

In the case where the cell gap (d) is 4 μm or more in a VA mode, there are some cases where it is not preferred since the liquid crystal display device has a large response time. A short response time is demanded for displaying a moving image, and a liquid crystal display device having a cell gap (d) of less than 4 μm is used therefor. In the case where the cell gap (d) is less than 3 μm, the optical anisotropy of the liquid crystal composition is preferably in a range of from 0.10 to 0.11. The situation is also applicable to an IPS mode.

Liquid Crystal Display Device

The liquid crystal composition of the invention can be applied to a liquid crystal display device. The liquid crystal display device of the invention can be driven in either an AM mode or a passive matrix (PM) mode and can have any operation mode, such as a PC mode, a TN mode, an STN mode, an OCB mode, a VA mode and an IPS mode. The liquid crystal display device driven in an AM mode or a PM mode can be applied to a liquid crystal display of any type, such as a reflection type, a transmission type and a semi-transmission type.

The liquid crystal composition of the invention can be applied to a dynamic scattering (DS) mode device using a liquid crystal composition containing an electroconductive agent, a nematic curvilinear aligned phase (NCAP) device prepared by microcapsulating a liquid crystal composition, and a polymer dispersed (PD) device, in which a three dimensional net-work polymer is formed in a liquid crystal composition, for example, a polymer network (PN) device.

Owing to the aforementioned characteristics of the liquid crystal composition of the invention, the liquid crystal composition can be preferably applied to an AM mode liquid crystal display device having an operation mode utilizing a negative dielectric anisotropy, such as a VA mode and an IPS mode, and particularly preferably applied to an AM mode liquid crystal display device having a VA mode.

In a liquid crystal display device having a TN mode, a VA mode or the like, the direction of the electric field is perpendicular to the liquid crystal layer. In a liquid crystal display device having an IPS mode or the like, the direction of the electric field is in parallel to the liquid crystal layer. The structure of the liquid crystal display device having a VA mode has been reported in K. Ohmuro, S. Kataoka, T. Sasaki and Y. Koike, SID '97 Digest of Technical Papers, vol. 28, p. 845 (1997), and the structure of the liquid crystal display device having an IPS mode has been reported in International Publication 91/10936/1991 (U.S. Pat. No. 5,576,867).

EXAMPLES

The invention will be explained in detail by way of Examples. The invention is not limited by the Examples described below. The compounds described in the Comparative Examples and the Examples are expressed by the symbols according to the definition in Table 1. In Table 1, the configuration of 1,4-cyclohexylene is a trans configuration. A ratio (percentage) of a liquid crystal compound is percentage by weight (% by weight) based on the total weight of liquid crystal compounds. In the Examples, the components are accurately weighed and mixed. The characteristics of the composition are summarized at the ends of the Examples.

The numbers shown next to the liquid crystal compounds used in the Examples correspond to the formula numbers showing the liquid crystal compounds used as the first, second, third and fourth components of the invention, and the case where only "-" is shown with no formula number means another liquid crystal compound that does not correspond to the first, second, third, and fourth components.

The method of description of the compounds using symbols is shown below.

TABLE 1

Method of Description of Compounds using Symbols
R—(A$_1$)—Z$_1$—...—Z$_n$—(A$_n$)—X

| | Symbol |
|---|---|
| 1) Left Terminal Group R— | |
| $C_nH_{2n+1}$— | n- |
| $C_nH_{2n+1}O$— | nO— |
| $C_nH_{2n+1}OC_mH_{2m}$— | nOm- |
| $CH_2$=CH— | V— |
| $CH_2$=CHC$_n$H$_{2n}$— | Vn- |
| 2) Ring Structure —A$_n$— | |
| 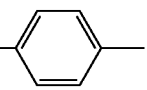 | B |
| 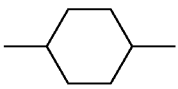 | H |
| 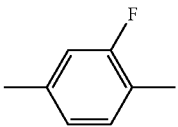 | B(3F) |

TABLE 1-continued

Method of Description of Compounds using Symbols
R—(A$_1$)—Z$_1$— ... —Z$_n$—(A$_n$)—X

| Structure | Symbol |
|---|---|
| [benzene ring with F at 2, F at 3] | B(2F,3F) |
| [benzene ring with F at 2, Cl at 3] | B(2F,3Cl) |
| [benzene ring with Cl at 2, F at 3] | B(2Cl,3F) |

3) Bonding Group —Z$_n$—

| | |
|---|---|
| —C$_n$H$_{2n}$— | n |
| —CH$_2$O— | 1O |
| —OCH$_2$— | O1 |
| —CH=CH— | V |
| —OCF$_2$— | OCF$_2$ |
| —OCF$_2$C$_n$H$_{2n}$— | OCF$_2$n |

4) Right Terminal Group —X

| | |
|---|---|
| —C$_n$H$_{2n+1}$ | -n |
| —OC$_n$H$_{2n+1}$ | —On |
| —CH=CH$_2$ | —V |
| —C$_n$H$_{2n}$CH=CH$_2$ | -nV |

5) Example of Description

Example 1 3-H2B(2F,3F)-3

[structure: C$_3$H$_7$—cyclohexyl—CH$_2$CH$_2$—phenyl(2F,3F)—C$_3$H$_7$]

Example 2 V2-HHB-2

[structure: CH$_2$=CH-CH$_2$CH$_2$—cyclohexyl—cyclohexyl—phenyl—C$_2$H$_5$]

Example 3 5-HHB(2F,3Cl)-O2

[structure: C$_5$H$_{11}$—cyclohexyl—cyclohexyl—phenyl(2F,3Cl)—OC$_2$H$_5$]

Measurements of the characteristics were carried out according to the following methods. Most methods are described in the Standard of Electric Industries Association of Japan, EIAJ ED-2521 A or those with some modifications.

(1) Maximum Temperature of a Nematic Phase (NI; ° C.)

A specimen was placed on a hot plate in a melting point apparatus equipped with a polarizing microscope and was heated at the rate of 1° C. per minute. A temperature was measured when a part of the specimen began to change from a nematic phase into an isotropic liquid. A higher limit of a temperature range of a nematic phase may be abbreviated to "a maximum temperature".

(2) Minimum Temperature of a Nematic Phase (Tc; ° C.)

A specimen having a nematic phase was kept in a freezer at temperatures of 0° C., –10° C., –20° C., –30° C. and –40° C. for ten days, respectively, and the liquid crystal phase was observed. For example, when the specimen remained in a nematic phase at –20° C. and changed to crystals or a smectic phase at –30° C., Tc was expressed as ≦–20° C. A lower limit of a temperature range of a nematic phase may be abbreviated to "a minimum temperature".

(3) Optical Anisotropy (Δn; Measured at 25° C.)

Measurement was carried out with an Abbe refractometer mounting a polarizing plate on an ocular using a light at a wavelength of 589 nm. The surface of a main prism was rubbed in one direction, and then a specimen was dropped on the main prism. The refractive index n∥ was measured when the direction of the polarized light was parallel to that of the rubbing, and the refractive index n⊥ was measured when the direction of the polarized light was perpendicular to that of the rubbing. A value (Δn) of optical anisotropy was calculated from the equation:

$$\Delta n = n_\parallel - n_\perp$$

(4) Viscosity (η; mPa·s, Measured at 20° C.)

The measurement was carried out by using an E-type viscometer.

(5) Dielectric Anisotropy (Δ∈; Measured at 25° C.)

A solution of octadecyltriethoxysilane (0.16 mL) dissolved in ethanol (20 mL) was coated on a glass substrate having been well cleaned. The glass substrate was rotated with a spinner and then heated to 150° C. for 1 hour. A VA device having a distance (cell gap) of 20 μm was fabricated with two sheets of the glass substrates.

A polyimide orientation film was coated on a glass substrate having been well cleaned. The orientation film thus obtained on the glass substrate was baked and then subjected to a rubbing treatment. A TN device having a distance between two sheets of the glass substrates of 9 μm and a twisted angle of 80° was fabricated.

A specimen (liquid crystal composition) was charged in the VA device, to which a voltage of 0.5 V (1 kHz, sine wave) was applied, and a dielectric constant (∈∥) in the major axis direction of the liquid crystal molecule was measured.

A specimen was charged in the TN device, to which a voltage of 0.5V (1 kHz, sine wave) was applied, and a dielectric constant (∈⊥) in the minor axis direction of the liquid crystal molecule was measured.

The dielectric anisotropy Δ∈ was calculated by the equation:

$$\Delta\in = \in_\parallel - \in_\perp$$

A composition having the negative value is a composition having a negative dielectric anisotropy.

(6) Voltage Holding Ratio (VHR; Measured at 25° C. and 100° C.; %)

A specimen was charged in a TN device having a polyimide orientation film and having a distance between two glass substrate (cell gap) of 6 μm. A pulse voltage (60 μs at 5 V) was applied to the TN device at 25° C. to charge the device. The waveform of the voltage applied to the TN device was observed with a cathode ray oscilloscope, and an area surrounded by the voltage curve and the abscissa per unit cycle (16.7 ms) was obtained. The area was obtained in the same manner from a waveform obtained after removing the TN device. The value of the voltage holding ratio (%) was calculated by the equation:

(voltage holding ratio)=(area with TN device)/(area without TN device)×100

The voltage holding ratio thus obtained was designated as VHR-1. Subsequently, the TN device was heated to 100° C. for 250 hours. After cooling the TN device to 25° C., the voltage holding ratio was measured in the same manner. The voltage holding ratio obtained after the heating test was designated as VHR-2. The heating test is an accelerating test and is a test corresponding to a long term durability test of the TN device.

(7) Specific Resistance (ρ; Measured at 25° C.; Ωcm)

1.0 mL of a liquid crystal was charged in a liquid cell, to which a direct current voltage of 10 V was applied. After lapsing 10 second from the application of voltage, the direct electric current of the cell was measured for calculating the specific resistance. The specific resistance was calculated by the equation:

(specific resistance)=((voltage)×(cell capacity))/((direct current)×(dielectric constant of vacuum))

(8) Gas Chromatographic Analysis

Gas Chromatograph Model GC-14B made by Shimadzu Corp. or an equivalent thereof was used as a measuring apparatus. Capillary Column CBP1-M25-025 (length: 25 m, bore: 0.22 mm, film thickness: 0.25 μm, dimethylpolysiloxane as stationary phase, no polarity) made by Shimadzu Corp. was used as a column. Helium was used as a carrier gas, and the flow rate was controlled to 2 mL/min. The column was maintained at 200° C. for 2 minutes and then further heated to 280° C. at a rate of 5° C. per minute. A specimen evaporating chamber was set up at 280° C., and a detector (FID) was set up at 300° C.

A specimen was dissolved in acetone to prepare a solution of 0.1% by weight, and 1 μL of the resulting solution was injected into the specimen evaporating chamber.

The recorder used was Chromatopac Model C-R5A made by Shimadzu Corp. or an equivalent thereof. Gas chromatogram obtained showed a retention time of a peak and a peak area corresponding to the component compound.

The solvent for diluting the specimen may also be, for example, chloroform or hexane. The following capillary columns may also be used: DB-1 made by Agilent Technologies Inc. (length: 30 m, bore: 0.32 mm, film thickness: 0.25 μm), HP-1 made by Agilent Technologies Inc. (length: 30 m, bore: 0.32 mm, film thickness: 0.25 μm), Rtx-1 made by Restek Corp. (length: 30 m, bore: 0.32 mm, film thickness: 0.25 μm), and BP-1 made by SGE International Pty. Ltd. (length: 30 m, bore: 0.32 mm, film thickness: 0.25 μm). In order to prevent compound peaks from overlapping, a capillary column CBP1-M50-025 (length: 50 m, bore: 0.25 mm, film thickness: 0.25 μm) made by Shimadzu Corp. may be used.

An area ratio of each peak in the gas chromatogram corresponds to the ratio of the component compounds. In general, the percentage by weight of the component compound is not completely identical to the area ratio of each peak. According to the invention, however, the percentage by weight of the component compound may be regarded to be identical to the percentage by area of each peak since the correction coefficient is substantially 1 when these capillary columns are used. This is because there is no significant difference in correction coefficient among the liquid crystal compounds as the component compounds. In order to obtain more precisely the compositional ratio of the liquid crystal compounds in the liquid crystal composition by gas chromatogram, an internal reference method is applied to gas chromatogram. The liquid crystal compound components (components to be measured) having been precisely weighed and a standard liquid crystal compound (standard substance) are simultaneously measured by gas chromatography, and the relative intensity of the area ratio of peaks of the components to be measured and a peak of the standard substance is calculated in advance. The compositional ratio of the liquid crystal compounds in the liquid crystal composition can be precisely obtained by gas chromatography analysis by correcting using the relative intensity of the peak areas of the components with respect to the standard substance.

Comparative Example 1

The composition of Comparative Example 1 contains the second component and the third component of the invention. The liquid crystal composition of the invention has a small viscosity and a low minimum temperature of a nematic phase, as compared to Comparative Example 1.

| 3-HB(2F,3Cl)-O2  | (2-1-1-1) | 13% |
| 5-HB(2F,3Cl)-O2  | (2-1-1-1) | 13% |
| 3-HHB(2F,3Cl)-O2 | (2-2-1-1) | 6%  |
| 4-HHB(2F,3Cl)-O2 | (2-2-1-1) | 2%  |
| 5-HHB(2F,3Cl)-O2 | (2-2-1-1) | 6%  |
| 3-HBB(2F,3Cl)-O2 | (2-2-1-2) | 10% |
| 5-HBB(2F,3Cl)-O2 | (2-2-1-2) | 10% |
| 3-HH-V           | (3-1)     | 30% |
| 3-HH-V1          | (3-1)     | 10% |

NI=70.2° C.; $T_c \leq -10$° C.; Δn=0.082; Δ∈=−2.6; η=25.6 mPa·s; VHR-1=99.1%

Comparative Example 2

The composition of Comparative Example 2 contains the second component and the third component of the invention. The composition of Comparative Example 2 has a large viscosity and a high minimum temperature of a nematic phase. The liquid crystal composition of the invention has a small viscosity and a low minimum temperature of a nematic phase, as compared to Comparative Example 2.

| 3-HB(2F,3Cl)-O2  | (2-1-1-1) | 16% |
| 5-HB(2F,3Cl)-O2  | (2-1-1-1) | 16% |
| 3-HHB(2F,3Cl)-O2 | (2-2-1-1) | 4%  |
| 4-HHB(2F,3Cl)-O2 | (2-2-1-1) | 4%  |
| 5-HHB(2F,3Cl)-O2 | (2-2-1-1) | 4%  |
| 3-HBB(2F,3Cl)-O2 | (2-2-1-2) | 12% |
| 5-HBB(2F,3Cl)-O2 | (2-2-1-2) | 12% |
| 3-HH-V           | (3-1)     | 22% |
| 3-HH-V1          | (3-1)     | 8%  |
| V-HHB-1          | (3-4)     | 2%  |

NI=71.9° C.; $T_c \leq -10$° C.; Δn=0.089; Δ∈=−3.1; η=37.8 mPa·s; VHR-1=99.1%

Comparative Example 3

The composition of Comparative Example 3 contains the second component and the third component of the invention. The liquid crystal composition of the invention has a further smaller viscosity, as compared to Comparative Example 3.

| | | |
|---|---|---|
| 3-HB(2F,3Cl)-O2 | (2-1-1-1) | 15% |
| 5-HB(2F,3Cl)-O2 | (2-1-1-1) | 14% |
| 3-HHB(2F,3Cl)-O2 | (2-2-1-1) | 8% |
| 5-HHB(2F,3Cl)-O2 | (2-2-1-1) | 8% |
| 3-HH2B(2F,3Cl)-O2 | (2-2) | 9% |
| 5-HH2B(2F,3Cl)-O2 | (2-2) | 8% |
| 3-HH-V | (3-1) | 16% |
| 5-HH-V | (3-1) | 22% |

NI=70.1° C.; $T_c \leq -20$° C.; $\Delta n$=0.069; $\Delta\epsilon$=−2.6; $\eta$=20.8 mPa·s; VHR-1=99.3%

Comparative Example 4

The composition of Comparative Example 4 contains the third component and the fourth component of the invention. The composition of Comparative Example 4 has a small viscosity, but has a low maximum temperature of a nematic phase and a high minimum temperature of a nematic phase, and thus has a narrow temperature range of a nematic phase.

| | | |
|---|---|---|
| 3-HH-4 | (3-1) | 7% |
| 3-HH-5 | (3-1) | 7% |
| 3-HB-O1 | (3-2) | 8% |
| 5-HB-3 | (3-2) | 8% |
| 3-HB(2F,3F)-O2 | (4-1) | 14% |
| 5-HB(2F,3F)-O2 | (4-1) | 14% |
| 3-HHB(2F,3F)-1 | (4-2) | 10% |
| 5-HHB(2F,3F)-1 | (4-2) | 10% |
| 3-HHB(2F,3F)-O2 | (4-2) | 11% |
| 5-HHB(2F,3F)-O2 | (4-2) | 11% |

NI=68.9° C.; $T_c \leq -10$° C.; $\Delta n$=0.081; $\Delta\epsilon$=−3.3; $\eta$=20.3 mPa·s; VHR-1=99.3%

Comparative Example 5

The composition of Comparative Example 5 contains the third component and the fourth component of the invention. The liquid crystal composition of the invention has a further smaller viscosity, as compared to Comparative Example 5.

| | | |
|---|---|---|
| 3-HH-V | (3-1) | 30% |
| V-HHB-1 | (3-4) | 10% |
| 2-BB(3F)B-3 | (3-6) | 10% |
| 3-HB(2F,3F)-O2 | (4-1) | 15% |
| 5-HB(2F,3F)-O2 | (4-1) | 15% |
| 3-HHB(2F,3F)-O2 | (4-2) | 10% |
| 5-HHB(2F,3F)-O2 | (4-2) | 10% |

NI=73.1° C.; $T_c \leq -20$° C.; $\Delta n$=0.094; $\Delta\epsilon$=−2.4; $\eta$=14.7 mPa·s; VHR-1=99.3%

Example 1

| | | |
|---|---|---|
| 3-H2B(2F,3F)-O2 | (1-1) | 13% |
| 5-H2B(2F,3F)-O2 | (1-1) | 13% |
| 3-HHB(2F,3Cl)-O2 | (2-2-1-1) | 6% |
| 4-HHB(2F,3Cl)-O2 | (2-2-1-1) | 2% |
| 5-HHB(2F,3Cl)-O2 | (2-2-1-1) | 6% |

-continued

| | | |
|---|---|---|
| 3-HBB(2F,3Cl)-O2 | (2-2-1-2) | 10% |
| 5-HBB(2F,3Cl)-O2 | (2-2-1-2) | 10% |
| 3-HH-V | (3-1) | 30% |
| 3-HH-V1 | (3-1) | 10% |

NI=72.1° C.; $T_c \leq -20$° C.; $\Delta n$=0.085; $\Delta\epsilon$=−2.6; $\eta$=19.1 mPa·s; VHR-1=99.3%

The composition of Example 1 is a composition obtained by replacing the second component represented by formula (2-1-1-1) in Comparative Example 1 by the first component represented by formula (1-1). As compared to Comparative Example 1, the composition of Example 1 having a combination of the first component and the second component as the essential components of the invention had a high maximum temperature of a nematic phase and a low minimum temperature of a nematic phase to enhance the temperature range of a nematic phase. The composition had a significantly low viscosity as compared to Comparative Example 1 and also had a large voltage holding ratio.

Example 2

The following composition was prepared, and the characteristic values thereof were measured by the aforementioned methods.

| | | |
|---|---|---|
| 3-H2B(2F,3F)-O2 | (1-1) | 15% |
| 5-H2B(2F,3F)-O2 | (1-1) | 15% |
| 2-HHB(2F,3Cl)-O2 | (2-2-1-1) | 3% |
| 3-HHB(2F,3Cl)-O2 | (2-2-1-1) | 5% |
| 4-HHB(2F,3Cl)-O2 | (2-2-1-1) | 5% |
| 5-HHB(2F,3Cl)-O2 | (2-2-1-1) | 5% |
| 3-HBB(2F,3Cl)-O2 | (2-2-1-2) | 8% |
| 5-HBB(2F,3Cl)-O2 | (2-2-1-2) | 8% |
| 3-HH-V | (3-1) | 26% |
| 3-HH-V1 | (3-1) | 10% |

NI=71.9° C.; $T_c \leq -20$° C.; $\Delta n$=0.084; $\Delta\epsilon$=−2.9; $\eta$=20.8 mPa·s; VHR-1=99.3%

As compared to Comparative Example 2, the composition of Example 2 had a low minimum temperature of a nematic phase and a small viscosity. As compared to Comparative Example 3, the composition of Example 2 had a high maximum temperature of a nematic phase and a large negative dielectric anisotropy.

Example 3

The following composition was prepared, and the characteristic values thereof were measured by the aforementioned methods.

| | | |
|---|---|---|
| 3-H2B(2F,3F)-O2 | (1-1) | 19% |
| 5-H2B(2F,3F)-O2 | (1-1) | 19% |
| 3-HHB(2F,3Cl)-O2 | (2-2-1-1) | 4% |
| 4-HHB(2F,3Cl)-O2 | (2-2-1-1) | 4% |
| 5-HHB(2F,3Cl)-O2 | (2-2-1-1) | 4% |
| 3-HBB(2F,3Cl)-O2 | (2-2-1-2) | 12% |
| 5-HBB(2F,3Cl)-O2 | (2-2-1-2) | 12% |
| 3-HH-V | (3-1) | 16% |
| 3-HH-V1 | (3-1) | 8% |
| V-HHB-1 | (3-4) | 2% |

NI=71.0° C.; $T_c \leq -20$° C.; $\Delta n$=0.093; $\Delta\epsilon$=−3.6; η=27.6 mPa·s; VHR-1=99.3%

The composition of Example 3 is a similar composition as Comparative Example 2. Owing to the combination of the first component, the second component and the third component of the invention, the composition of Example 3 has a low minimum temperature of a nematic phase, a small viscosity and a large negative dielectric anisotropy, as compared to Comparative Example 2.

Example 4

The following composition was prepared, and the characteristic values thereof were measured by the aforementioned methods.

| | | |
|---|---|---|
| 3-H2B(2F,3F)-O2 | (1-1) | 14% |
| 5-H2B(2F,3F)-O2 | (1-1) | 14% |
| 3-HH2B(2F,3F)-O2 | (1-2) | 6% |
| 5-HH2B(2F,3F)-O2 | (1-2) | 6% |
| 3-HB(2F,3Cl)-O2 | (2-1-1-1) | 10% |
| 5-HB(2F,3Cl)-O2 | (2-1-1-1) | 10% |
| 3-HHB(2F,3Cl)-O2 | (2-2-1-1) | 5% |
| 5-HHB(2F,3Cl)-O2 | (2-2-1-1) | 5% |
| 3-HBB(2F,3Cl)-O2 | (2-2-1-2) | 15% |
| 5-HBB(2F,3Cl)-O2 | (2-2-1-2) | 15% |

NI=79.0° C.; $T_c \leq -20$° C.; $\Delta n$=0.111; $\Delta\epsilon$=−4.8

The composition of Example 4 contains the first component and the second component of the invention. The composition of Example 4 had a high maximum temperature of a nematic phase and a significantly large negative dielectric anisotropy.

Example 5

The following composition was prepared, and the characteristic values thereof were measured by the aforementioned methods.

| | | |
|---|---|---|
| 3-H2B(2F,3F)-O2 | (1-1) | 13% |
| 5-H2B(2F,3F)-O2 | (1-1) | 13% |
| 3-HHB(2F,3Cl)-O2 | (2-2-1-1) | 7% |
| 5-HHB(2F,3Cl)-O2 | (2-2-1-1) | 7% |
| 3-HH-V | (3-1) | 30% |
| 3-HH-V1 | (3-1) | 10% |
| 3-HBB(2F,3F)-O2 | (4-3) | 10% |
| 5-HBB(2F,3F)-O2 | (4-3) | 10% |

NI=74.9° C.; $T_c \leq -20$° C.; $\Delta n$=0.089; $\Delta\epsilon$=−2.6; η=13.5 mPa·s; VHR-1=99.3%

The composition of Example 5 contains the first component, the second component, the third component and the fourth component of the invention. The composition of Example 5 had a smaller viscosity than Comparative Example 5 having a small viscosity, and has a large negative dielectric anisotropy.

Example 6

The following composition was prepared, and the characteristic values thereof were measured by the aforementioned methods.

| | | |
|---|---|---|
| 3-HH2B(2F,3F)-O2 | (1-2) | 8% |
| 5-HH2B(2F,3F)-O2 | (1-2) | 8% |
| 3-HB(2F,3Cl)-O2 | (2-1-1-1) | 8% |
| 5-HB(2F,3Cl)-O2 | (2-1-1-1) | 8% |
| 3-HHB(2F,3Cl)-O2 | (2-2-1-1) | 8% |
| 5-HHB(2F,3Cl)-O2 | (2-2-1-1) | 8% |
| 3-HH-V | (3-1) | 14% |
| 3-HH-V1 | (3-1) | 8% |
| 5-HH-V | (3-1) | 14% |
| V-HHB-1 | (3-4) | 3% |
| 3-BOCF$_2$B(2F,3F)-O2 | — | 8% |
| 3-HBOCF$_2$B(2F,3F)-O2 | — | 5% |

NI=77.1° C.; $T_c \leq -20$° C.; $\Delta n$=0.077; $\Delta\epsilon$=−2.6; η=15.3 mPa·s; VHR-1=99.2%

Example 7

The following composition was prepared, and the characteristic values thereof were measured by the aforementioned methods.

| | | |
|---|---|---|
| 3-H2B(2F,3F)-O2 | (1-1) | 15% |
| 3-HH2B(2F,3F)-O2 | (1-2) | 6% |
| 3-HB(2F,3Cl)-O2 | (2-1-1-1) | 15% |
| 3-HHB(2F,3Cl)-O2 | (2-2-1-1) | 6% |
| 3-HBB(2F,3Cl)-O2 | (2-2-1-2) | 9% |
| 3-HHB(2Cl,3F)-O2 | (2-2-1-3) | 6% |
| 2-HH-5 | (3-1) | 4% |
| 3-HH-4 | (3-1) | 10% |
| 3-HH-V1 | (3-1) | 7% |
| 3-HB-O2 | (3-2) | 2% |
| V-HHB-1 | (3-4) | 4% |
| 2-BB(3F)B-3 | (3-6) | 7% |
| 3-HBB(2F,3F)-O2 | (4-3) | 9% |

NI=79.6° C.; $T_c \leq -20$° C.; $\Delta n$=0.105; $\Delta\epsilon$=−2.9; η=35.5 mPa·s; VHR-1=99.2%

What is claimed is:

1. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1) to (2-3):

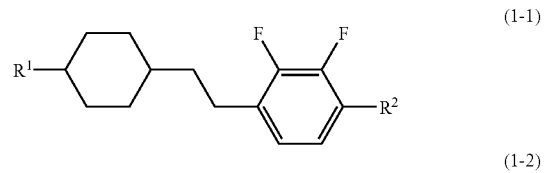

(1-1)

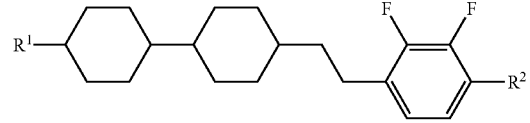

(1-2)

-continued (2-1)
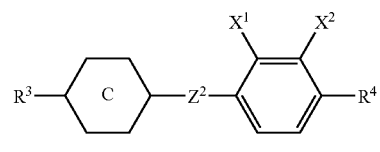

(2-2)
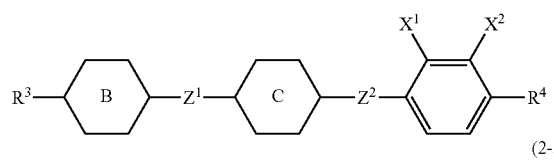

(2-3)
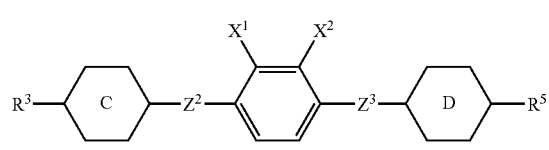

wherein in formulas (1-1) and (1-2) and formulas (2-1) to (2-3), $R^1$ and $R^3$ are each independently alkyl or alkenyl;

$R^2$, $R^4$ and $R^5$ are each independently alkyl, alkenyl or alkoxy;

ring B, ring C and ring D are each independently 1,4-cyclohexylene or 1,4-phenylene;

$Z^1$, $Z^2$ and $Z^3$ are each independently a single bond, —(CH$_2$)$_2$—, —CH$_2$O— or —OCH$_2$—; and one of $X^1$ and $X^2$ is fluorine, and the other is chlorine.

2. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1-1), (2-2-1) and (2-3-1):

(1-1)
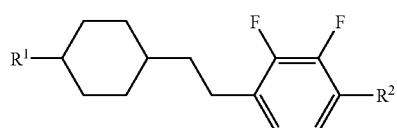

(1-2)
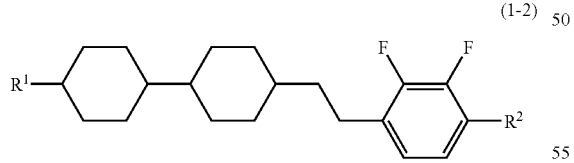

(2-1-1)
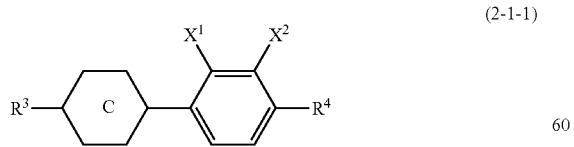

(2-2-1)
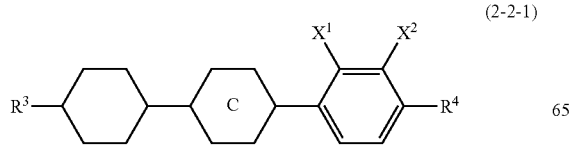

(2-3-1)
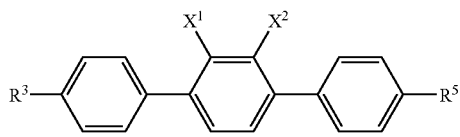

wherein in formulas (1-1) and (1-2) and formulas (2-1-1), (2-2-1) and (2-3-1), $R^1$ and $R^3$ are each independently alkyl or alkenyl;

$R^2$, $R^4$ and $R^5$ are each independently alkyl, alkenyl or alkoxy;

ring C is independently 1,4-cyclohexylene or 1,4-phenylene; and one of $X^1$ and $X^2$ is fluorine, and the other is chlorine.

3. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1-1-1) to (2-1-1-4) and (2-2-1-1) to (2-2-1-4):

(1-1)
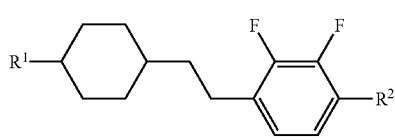

(1-2)
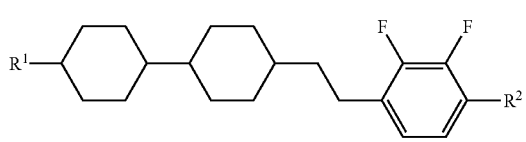

(2-1-1-1)
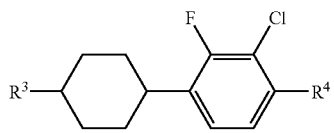

(2-1-1-2)
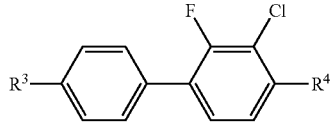

(2-1-1-3)
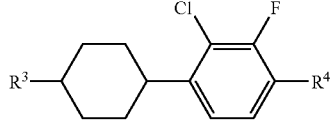

(2-1-1-4)
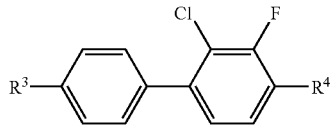

(2-2-1-1)
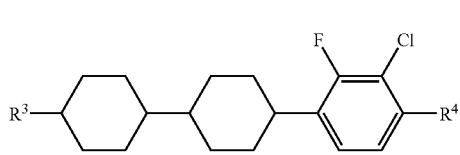

-continued (2-2-1-2)

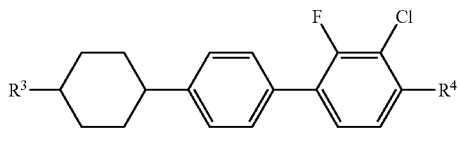

(2-2-1-3)

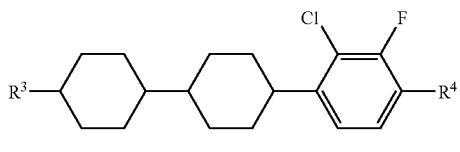

(2-2-1-4)

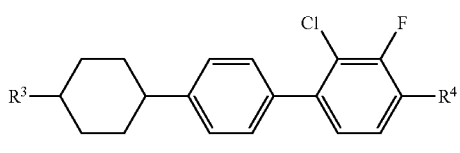

wherein in formulas (1-1) and (1-2) and formulas (2-1-1-1) to (2-1-1-4) and (2-2-1-1) to (2-2-1-4), $R^1$ and $R^3$ are each independently alkyl or alkenyl; and $R^2$ and $R^4$ are each independently alkyl, alkenyl or alkoxy.

4. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1-1-1), (2-1-1-2), (2-2-1-1) and (2-2-1-2):

(1-1)

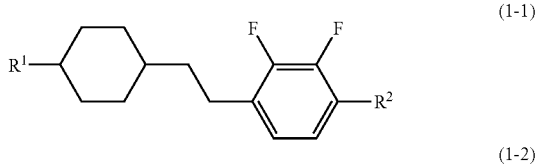

(1-2)

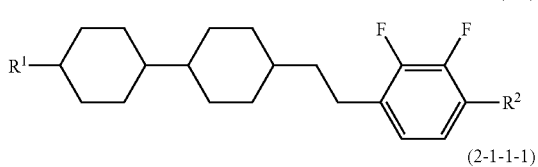

(2-1-1-1)

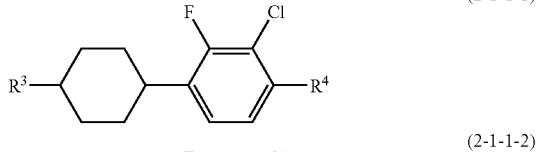

(2-1-1-2)

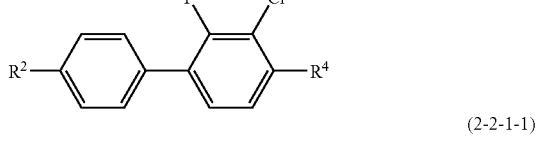

(2-2-1-1)

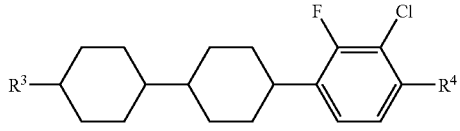

-continued (2-2-1-2)

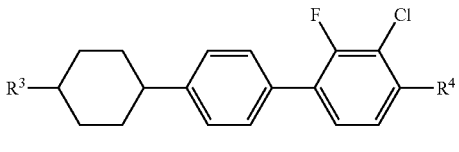

wherein in formulas (1-1) and (1-2) and formulas (2-1-1-1), (2-1-1-2), (2-2-1-1) and (2-2-1-2), $R^1$ and $R^3$ are each independently alkyl or alkenyl; and $R^2$ and $R^4$ are each independently alkyl, alkenyl or alkoxy.

5. The liquid crystal composition according to claim 4, wherein the first component is at least one compound selected from the group of compounds represented by formula (1-1), and the second component is at least one compound selected from the group of compounds represented by formulas (2-2-1-1) and (2-2-1-2).

6. The liquid crystal composition according to claim 4, wherein the first component is at least one compound selected from the group of compounds represented by formula (1-2), and the second component is at least one compound selected from the group of compounds represented by formulas (2-1-1-1) and (2-1-1-2).

7. The liquid crystal composition according to claim 4, wherein the first component is a mixture of at least one compound selected from the group of compounds represented by formula (1-1) and at least one compound selected from the group of compounds represented by formula (1-2), and the second component is at least one compound selected from the group of compounds represented by formulas (2-2-1-1) and (2-2-1-2).

8. The liquid crystal composition according to claim 4, wherein the first component is a mixture of at least one compound selected from the group of compounds represented by formula (1-1) and at least one compound selected from the group of compounds represented by formula (1-2), and the second component is a mixture of at least one compound selected from the group of compounds represented by formulas (2-1-1-1) and (2-1-1-2) and at least one compound selected from the group of compounds represented by formulas (2-2-1-1) and (2-2-1-2).

9. The liquid crystal composition according to claim 1, wherein a content ratio of the first component is from 20% to 70% by weight, and a content ratio of the second component is from 10% to 70% by weight, based on the total weight of the liquid crystal compounds.

10. The liquid crystal composition according to claim 1, wherein the composition further comprises, in addition to the first component and the second component, at least one compound selected from the group of compounds represented by formula (3) as a third component:

(3)

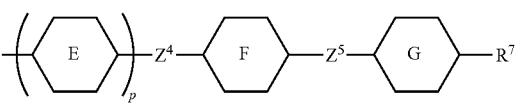

wherein in formula (3), $R^6$ is independently alkyl or alkenyl;

$R^7$ is independently alkyl, alkenyl or alkoxy;

ring E, ring F and ring G are each independently 1,4-cyclohexylene, 1,4-phenylene, 2-fluoro-1,4-phenylene or 3-fluoro-1,4-phenylene;

$Z^4$ and $Z^5$ are each independently a single bond, —(CH$_2$)$_2$—, —CH$_2$O—, —OCH$_2$—, —COO— or —OCO—; and P is 0 or 1.

11. The liquid crystal composition according to claim 10, wherein the third component is at least one compound selected from the group of compounds represented by formulas (3-1) to (3-7):

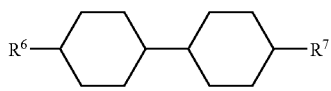
(3-1)

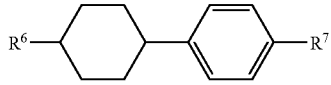
(3-2)

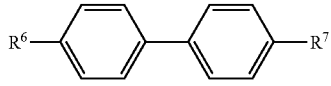
(3-3)

(3-4)

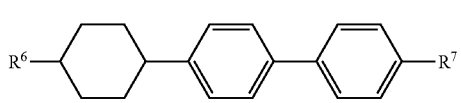
(3-5)

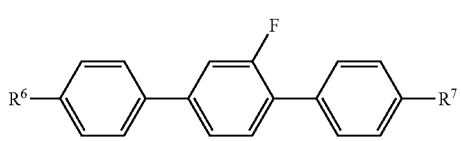
(3-6)

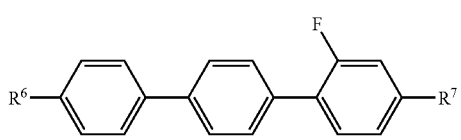
(3-7)

wherein in formulas (3-1) to (3-7), $R^6$ is independently alkyl or alkenyl; and $R^7$ is independently alkyl, alkenyl or alkoxy.

12. The liquid crystal composition according to claim 10, wherein the third component is at least one compound selected from the group of compounds represented by formulas (3-1), (3-2), (3-4) and (3-6):

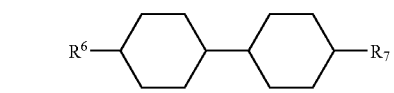
(3-1)

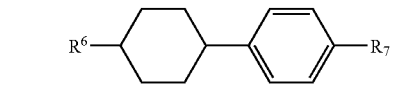
(3-2)

(3-4)

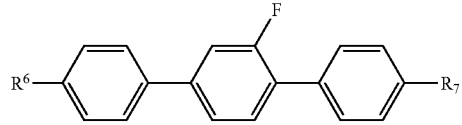
(3-6)

wherein in formulas (3-1), (3-2), (3-4) and (3-6), $R^6$ is independently alkyl or alkenyl; and $R^7$ is independently alkyl, alkenyl or alkoxy.

13. The liquid crystal composition according to claim 10, wherein a content ratio of the first component is from 20% to 70% by weight, a content ratio of the second component is from 5% to 70% by weight, and a content ratio of the third component is from 10% to 50% by weight, based on the total weight of the liquid crystal compounds.

14. The liquid crystal composition according to claim 10, wherein the composition comprises three components, wherein the first component is at least one compound selected from the group of compounds represented by formulas (1-1) and (1-2), the second component is at least one compound selected from the group of compounds represented by formulas (2-1-1-1) to (2-1-1-4) and (2-2-1-1) to (2-2-1-4):

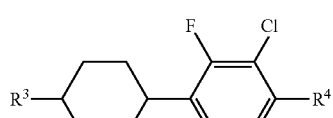
(2-1-1-1)

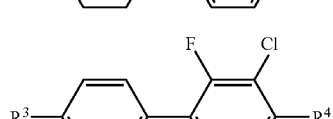
(2-1-1-2)

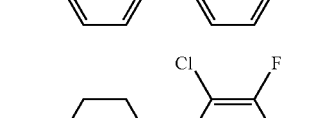
(2-1-1-3)

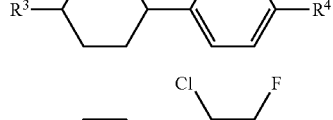
(2-1-1-4)

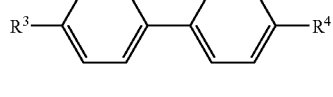
(2-2-1-1)

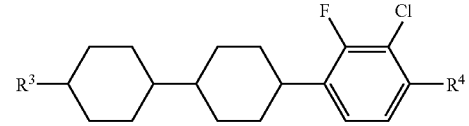
(2-2-1-2)

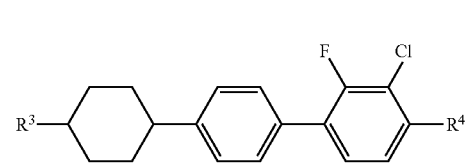

-continued

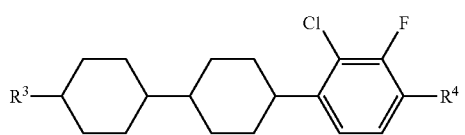
(2-2-1-3)

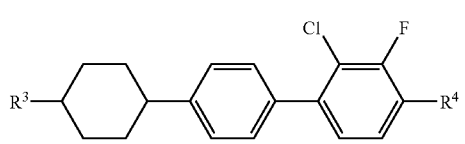
(2-2-1-4)

wherein in formulas (2-1-1-1) to (2-1-1-4) and (2-2-1-1) to (2-2-1-4),
$R^3$ are independently alkyl or alkenyl; and
$R^4$ are each independently alkyl, alkenyl or alkoxy, and
the third component is at least one compound selected from the group of compounds represented by formulas (3-1), (3-2), (3-4) and (3-6):

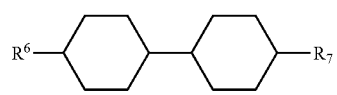
(3-1)

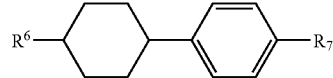
(3-2)

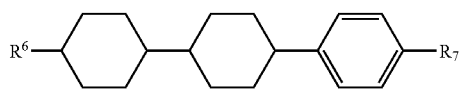
(3-4)

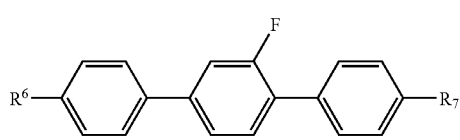
(3-6)

wherein in formulas (3-1), (3-2), (3-4) and (3-6),
$R^6$ is independently alkyl or alkenyl; and
$R^7$ is independently alkyl, alkenyl or alkoxy.

15. The liquid crystal composition according to claim 10, wherein the first component is at least one compound selected from the group of compounds represented by formula (1-1), the second component is at least one compound selected from the group of compounds represented by formulas (2-2-1-1) and (2-2-1-2):

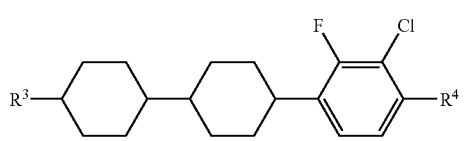
(2-2-1-1)

-continued

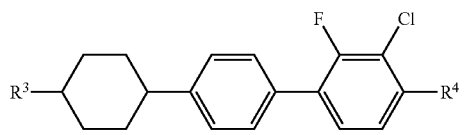
(2-2-1-2)

wherein in formulas (2-2-1-1) and (2-2-1-2),
$R^3$ are independently alkyl or alkenyl; and
$R^4$ are each independently alkyl, alkenyl or alkoxy, and
the third component is at least one compound selected from the group of compounds represented by formulas (3-1), (3-2), (3-4) and (3-6):

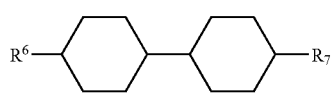
(3-1)

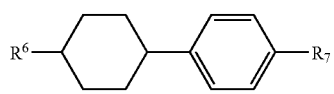
(3-2)

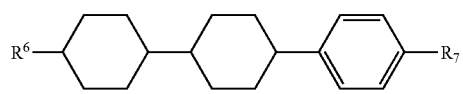
(3-4)

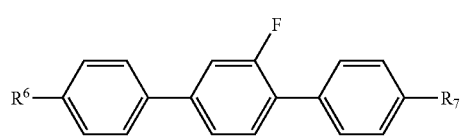
(3-6)

wherein in formulas (3-1), (3-2), (3-4) and (3-6),
$R^6$ is independently alkyl or alkenyl; and
$R^7$ is independently alkyl, alkenyl or alkoxy.

16. The liquid crystal composition according to claim 10, wherein the first component is at least one compound selected from the group of compounds represented by formula (1-2), the second component is at least one compound selected from the group of compounds represented by formulas (2-1-1-1) and (2-1-1-2):

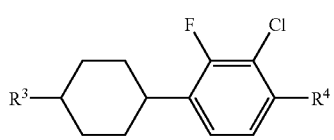
(2-1-1-1)

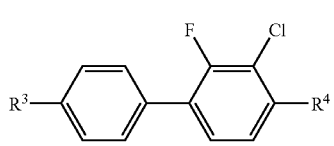
(2-1-1-2)

wherein in formulas (2-1-1-1) and (2-1-1-2),
$R^3$ are independently alkyl or alkenyl; and
$R^4$ are each independently alkyl, alkenyl or alkoxy, and
the third component is at least one compound selected from the group of compounds represented by formulas (3-1), (3-2), (3-4) and (3-6):

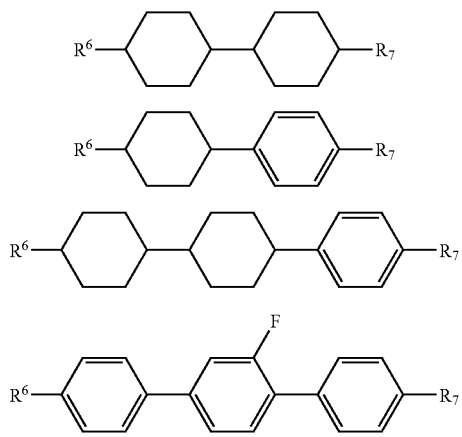

wherein in formulas (3-1), (3-2), (3-4) and (3-6),
R$^6$ is independently alkyl or alkenyl; and
R$^7$ is independently alkyl, alkenyl or alkoxy.

17. The liquid crystal composition according to claim 10, wherein the first component is a mixture of at least one compound selected from the group of compounds represented by formula (1-1) and at least one compound selected from the group of compounds represented by formula (1-2), the second component is at least one compound selected from the group of compounds represented by formulas (2-2-1-1) and (2-2-1-2):

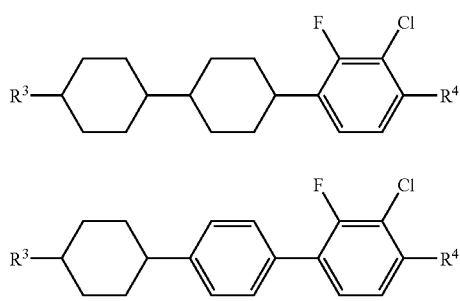

wherein in formulas (2-2-1-1) and (2-2-1-2),
R$^3$ are independently alkyl or alkenyl; and
R$^4$ are each independently alkyl, alkenyl or alkoxy, and
the third component is at least one compound selected from the group of compounds represented by formulas (3-1), (3-2), (3-4) and (3-6):

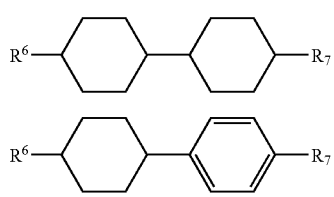

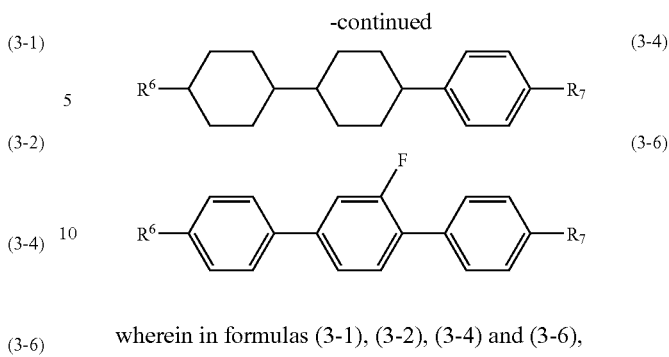

wherein in formulas (3-1), (3-2), (3-4) and (3-6),
R$^6$ is independently alkyl or alkenyl; and
R$^7$ is independently alkyl, alkenyl or alkoxy.

18. The liquid crystal composition according to claim 14, wherein a content ratio of the first component is from 25% to 70% by weight, a content ratio of the second component is from 10% to 65% by weight, and a content ratio of the third component is from 10% to 50% by weight, based on the total weight of the liquid crystal compounds.

19. The liquid crystal composition according to claim 10, wherein the composition further comprises, in addition to the first component, the second component and the third component, at least one compound selected from the group of compounds represented by formulas (4-1) to (4-4) as a fourth component:

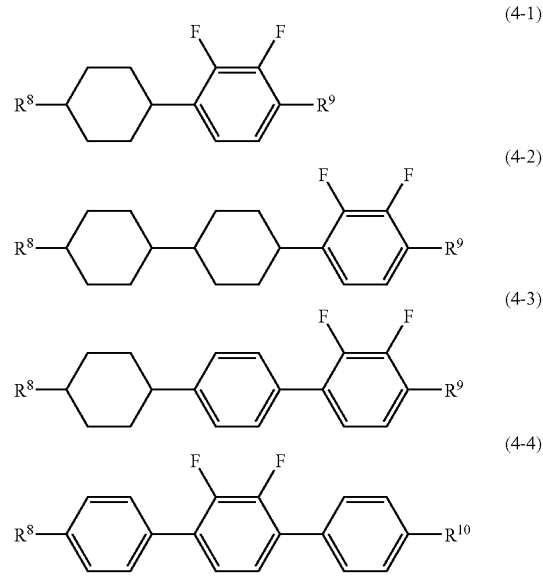

wherein in formulas (4-1) to (4-4),
R$^8$ is independently alkyl or alkenyl; and
R$^9$ and R$^{10}$ are each independently alkyl, alkenyl or alkoxy.

20. The liquid crystal composition according to claim 19, wherein the composition comprises four components, wherein the first component is at least one compound selected from the group of compounds represented by formulas (1-1) and (1-2), the second component is at least one compound selected from the group of compounds represented by formulas (2-1-1-1) to (2-1-1-4) and (2-2-1-1) to (2-2-1-4):

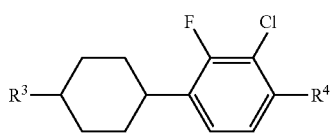 (2-1-1-1)

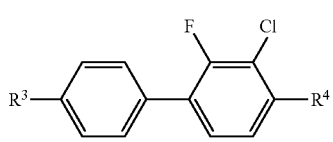 (2-1-1-2)

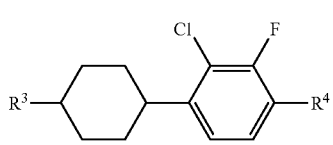 (2-1-1-3)

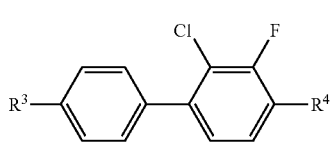 (2-1-1-4)

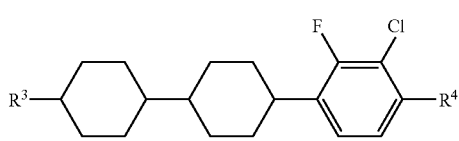 (2-2-1-1)

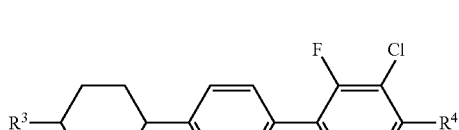 (2-2-1-2)

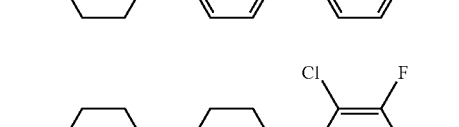 (2-2-1-3)

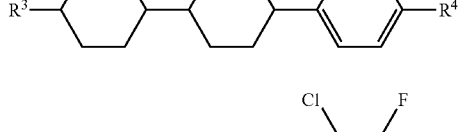 (2-2-1-4)

wherein in formulas (2-1-1-1) to (2-1-1-4) and (2-2-1-1) to (2-2-1-4), $R^3$ are independently alkyl or alkenyl; and
$R^4$ are each independently alkyl, alkenyl or alkoxy,
the third component is at least one compound selected from the group of compounds represented by formulas (3-1), (3-2), (3-4) and (3-6):

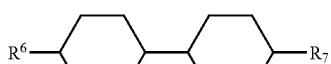 (3-1)

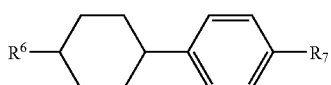 (3-2)

 (3-4)

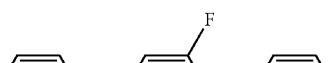 (3-6)

wherein in formulas (3-1), (3-2), (3-4) and (3-6),
$R^6$ is independently alkyl or alkenyl; and
$R^7$ is independently alkyl, alkenyl or alkoxy, and
the fourth component is at least one compound selected from the group of compounds represented by formulas (4-1), (4-2) and (4-3).

21. The liquid crystal composition according to claim 20, wherein a content ratio of the first component is from 25% to 70% by weight, a content ratio of the second component is from 10% to 55% by weight, a content ratio of the third component is from 10% to 50% by weight, and a content ratio of the fourth component is from 10% to 55% by weight, based on the total weight of the liquid crystal compounds.

22. The liquid crystal composition according to claim 1, wherein the composition has an optical anisotropy in a range of from 0.07 to 0.16.

23. The liquid crystal composition according to claim 1, wherein the composition has a dielectric anisotropy in a range of from −5.0 to −2.0.

24. A liquid crystal display device comprising the liquid crystal composition according to claim 1.

25. The liquid crystal display device according to claim 24, wherein the liquid crystal display device has an operation mode of a VA mode or an IPS mode and a driving mode of an active matrix mode.

* * * * *